(12) United States Patent
Swett et al.

(10) Patent No.: US 12,086,826 B1
(45) Date of Patent: Sep. 10, 2024

(54) CENTRALIZED IDENTITY FOR PERSONALIZATION OF DATA PRESENTATION

(71) Applicant: Block, Inc., San Francisco, CA (US)

(72) Inventors: Katherine Swett, Mount Pleasant, SC (US); Lisa Fong, Hayward, CA (US); Xuanhua Ren, San Francisco, CA (US); Jocelyn Fu, Auburndale, MA (US); Katherine Ahn, New York, NY (US); Vitaly Odemchuk, Brookhaven, GA (US); Bryan Ashley, Larkspur, CA (US); Joseph Boudreau, Toronto (CA)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/873,702

(22) Filed: Jul. 26, 2022

(51) Int. Cl.
*G06Q 30/0207* (2023.01)
*G06Q 20/02* (2012.01)
*G06Q 30/0601* (2023.01)

(52) U.S. Cl.
CPC ......... *G06Q 30/0222* (2013.01); *G06Q 20/02* (2013.01); *G06Q 30/0641* (2013.01)

(58) Field of Classification Search
CPC .................. G06Q 30/0222; G06Q 30/0641
See application file for complete search history.

(56) References Cited

U.S. PATENT DOCUMENTS

| 10,091,230 | B1 * | 10/2018 | Machani | H04L 67/306 |
| 2002/0165967 | A1 * | 11/2002 | Morgan | G06F 16/9535 |
| | | | | 709/227 |
| 2011/0057025 | A1 * | 3/2011 | Denzer | G06Q 20/28 |
| | | | | 235/375 |
| 2012/0011447 | A1 * | 1/2012 | Bennett | G06F 9/451 |
| | | | | 715/745 |
| 2012/0317085 | A1 * | 12/2012 | Green | G06F 16/437 |
| | | | | 707/E17.058 |
| 2013/0185176 | A1 * | 7/2013 | Anchala | G06Q 30/0601 |
| | | | | 705/27.1 |
| 2013/0218667 | A1 * | 8/2013 | Mohamed | G06Q 30/02 |
| | | | | 705/14.66 |
| 2013/0326009 | A1 * | 12/2013 | Morgan | G06Q 30/02 |
| | | | | 709/217 |

(Continued)

OTHER PUBLICATIONS

To Federate or Not To Federate: A Reputation-Based Mechanism to Dynamize Cooperation in Identity Management. Arias Cabarcos, Patricia; Almenarez, Florina; Gomez Marmol, Felix; Marin, Andres; Marn, Andrs; et al. Wireless Personal Communications75.3: 1769-1786. Springer. (Apr. 2014) (Year: 2014).*

(Continued)

*Primary Examiner* — Michael Misiaszek
(74) *Attorney, Agent, or Firm* — Lee & Hayes, P.C.

(57) ABSTRACT

Techniques described herein are directed to centralized identities for personalization of data presentation. A centralized identity is generated when similar user identifiers as stored across resources are determined. The centralized identity associates the user identifiers with each other and allows for user-related data from the multiple disparate resources to be queried and received. This user-related data can then be utilized to determine one or more personalizations to apply, and an application being used by the user may be modified to present the personalizations.

20 Claims, 15 Drawing Sheets

(56) References Cited

U.S. PATENT DOCUMENTS

| | | | | |
|---|---|---|---|---|
| 2014/0122473 | A1* | 5/2014 | Fletcher | G06Q 50/01 |
| | | | | 707/732 |
| 2017/0103165 | A1* | 4/2017 | Dunlevy | G06F 16/215 |
| 2018/0025064 | A1* | 1/2018 | Atlas | G06F 7/02 |
| | | | | 707/737 |
| 2018/0329726 | A1* | 11/2018 | Hailpern | G06F 3/04817 |
| 2020/0220948 | A1* | 7/2020 | Stalter | H04W 4/40 |
| 2020/0286124 | A1* | 9/2020 | Hiremath | G06N 5/048 |
| 2021/0158420 | A1* | 5/2021 | Canfield | G06F 16/953 |
| 2022/0301699 | A1* | 9/2022 | Crockett | G16H 40/20 |
| 2023/0179552 | A1* | 6/2023 | Nangunoori | H04L 61/35 |
| | | | | 709/218 |
| 2023/0342167 | A1* | 10/2023 | Radkoff | G06F 40/174 |

OTHER PUBLICATIONS

Applied Identity Delivers ID-Unify for Identity Virtualization Into the Marketplace. Business Wire [New York] May 22, 2007: n/a. (Year: 2007).*

* cited by examiner

CENTRALIZED IDENTITY FOR PERSONALIZATION OF DATA PRESENTATION

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
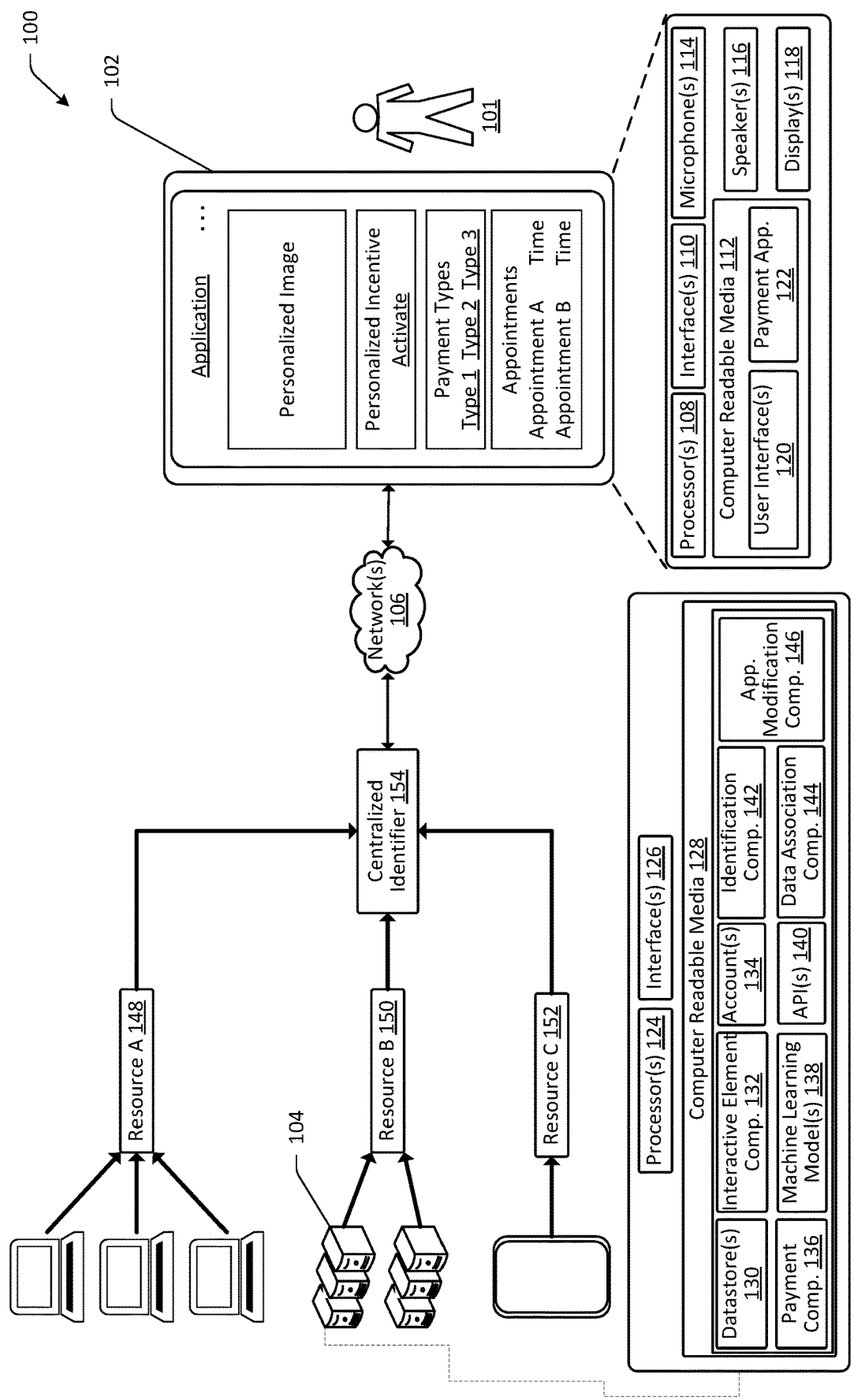
FIG. 1 is an example environment for centralized identities for personalization of data presentation, according to an embodiment described herein.

Techniques described herein are directed to, among other things, centralized identities for personalization of data presentation. In an example, techniques described herein may be utilized to identify user identifiers across multiple, disparate resources, to generate a centralized identity for the related user identifiers, and then to utilize data from the various resources to personalize presentation of data to a user, including in the context of a payment application or an ecommerce website associated with a merchant. Take, for example, a situation where a user is registered with multiple services, platforms, merchants, etc. (collectively referred to herein as "resources"). The user, a customer in this example, may have conducted transactions or otherwise interacted with these various resources over a certain period of time, and each resource may store data associated with those interactions. By way of one example, a given resource may be associated with merchant transactions, another resource may be associated with a rewards program, another resource may be associated with scheduling data, another resource may be associated with a payment application, another resource may be associated with an investment platform, another resource may be associated with a wish list, a messaging platform, gift cards, shopping, and so on. Other resources may include, for example, a loyalty program resource, a coupon resource, a promotions resource, an appointment scheduling resource, a feedback resource associated with customer feedback, an order-ahead resource associated with customers ordering items prior to when the items are available for purchase, an order tracking resource, a digital receipt resource, a purchase history resource, a user check-in resource associated with users providing input data for checking in to a service, an invoice resource, etc. Each of these resources may be maintained by various systems hosted by various entities or portions of the same entity. For each of these resources, a user identifier may be associated with the data stored by those resources. As such, in an example, a user that has utilized 10 resources may be associated with 10 different user identifiers. Additionally, for any given resource, hundreds or thousands of users may be associated with user identifiers. In these and other examples, it would be beneficial to parse the various user identifiers across various resources to determine which user identifiers are associated with the same user, and to generate a centralized identity that associates the user identifiers with each other. Once data for a given user across these disparate resources is associated, that data can be aggregated and utilized to enable functionality by devices with access to such data, such as the ability to personalize the presentation of data and user interfaces when the user at issue is involved.

To do so, a payment service may be configured to query one or more resources for identification data associated with user identifiers stored by the resources. While references herein are made to the payment service, a service other than a payment service may replace the payment service. For example, the service may be a music streaming service or a blockchain exchange service. Each of these resources may be associated with various devices, systems, and databases that may store data associated with various user identifiers. In some examples, the payment service itself may be a resource. The identification data may be returned to the payment service, which may determine whether similarities in the identification data are present across datasets for the various resources. The payment service may be configured to utilize this identification data to generate a similarity metric that indicates how similar identification data from a given resource is with respect to identification data from another resource. When the similarity metric satisfies a threshold similarity, the payment service may determine that user identifiers associated with the multiple resources correspond to the same user. Thereafter, the payment service may be configured to generate a centralized identity that maps to the user identifiers of the various resources.

The payment service may be further configured to receive an indication of the generation of the centralized identity and may be configured perform operations to associate the centralized identity with data from the various resources that are associated with the individual user identifiers. In an example, associating the centralized identity with the user-related data from the individual resources may include flagging a portion of the data stored in association with the user's user identifier in a given resource as data that is associated with the centralized identity. This data association technique may allow the payment service to query the various resources for user-related data by utilizing the centralized identity as the searching implement. In this example, an instance of the queried data may be returned to the payment service, which may aggregate the data from the various resources, format the data such that it is cohesive and thus can be utilized, and then utilize the user-related data for one or more purposes, including the personalization of data presentation to the user.

In another example, the payment service may be configured to request an instance of the user-related data from the various resources and may aggregate and store that user-related data in association with the centralized identity. In this example, the payment service may act as a user-related data storage mechanism and may not necessarily need to query the resources at issue when an action associated with the user is to be performed. Instead, the centralized identity may be utilized to query the payment service database for the aggregated user-related data, which may be utilized as described herein. In this example, the various resources may be queried on a scheduled basis, periodic basis, or otherwise to update the payment service database. In other examples, trigger events such as when changes are made to the user-related data at a given resource may cause the resource to push updated user-related data to the payment service database.

In examples, the payment service may be configured to receive the user-related data and determine if the user-related data indicates that one or more personalizations can be applied to a given application. To do so, the payment service may determine whether user-related data is similar across multiple resources. Depending on whether the user-related data is similar across the various resources, the payment service may determine how personalizations should be applied.

In examples where the user-related data is similar in one or more respects across multiple resources, the payment service may identify the similar data and may determine one or more personalizations based on that similar data. In one example, the similar data may include the purchase of specific items, the use or availability of specific incentives, the use of specific user preferences, etc. In other examples, an item that is offered for sale that was purchased across multiple resources by the user, or that was recommended across multiple resources, or that is associated with incentives across multiple resources, or that is associated with a given user preference across resources may be a strong signal that such an item should be highlighted or otherwise ranked more favorably when presented to a user.

In another example, payment service may determine the presence of incentives across multiple resources for a given user and, based at least on that determination, may display the incentives together in the same user interface. In another example, the payment service may determine scheduling data across multiple resources for a given user and, based at least in part on that determination, may display targeted availability options for a given service in light of the scheduling data. In yet another example, the payment service may determine transaction data across multiple resources, where the transaction data may indicate that the user purchases items having certain characteristics in association with those multiple resources, and the payment service may modify the application at issue to display those item details. In another example, the payment service may determine that the user-related data may indicate multiple payment methods available to the user across the multiple resources, and the payment service may cause display of some or all of these options in a given user interface.

Additional personalizations may include the auto-population of information in a given application, the generation of affiliate links for user selection, and the availability of single use payment instruments. By so doing, the techniques described herein may be able to parse disparate data sources for user-related information on the fly and based on the application currently being utilized to dynamically modify the application such that personalizations are applied from the user-related data.

In some examples, machine learning techniques may be utilized to facilitate the operations described herein. For example, a machine learning model may be generated and configured to utilize, as input, some or all of the user identifiers or user-related data to determine which user identifiers apply to a given user, which user-related data is associated with a given centralized identity, which personalizations should be selected, etc. The machine learning model may be trained utilizing a training dataset that indicates prior results of the machine learning model and feedback data indicating the accuracy or desirability of the results. A machine-trained model may be generated using the training dataset, and the machine-trained model may be utilized to perform the operations described above. In these examples, a number of factors determined to be relevant by the machine-trained model may be utilized to determine user identifier similarities, user-related data similarities, and personalization desirability. Additional details on the use of machine learning techniques to determine items and merchants is described elsewhere herein.

In association with the operations described above, with the proliferation of digital platforms for sharing information and for performing transactions, there is a computer-centric problem of how to parse vast databases of information across disparate platforms to quickly and accurately acquire data associated with a single user. These datasets are maintained by different systems, which may be maintained by different entities, and do not have data pipelining technology that allows for the quick and accurate determination of what data from what databases matches a given user. Additionally, given that such databases change continuously, the ability to parse and acquire such data on the fly is difficult and certainly could not be performed by a human to generate the time sensitive application modifications described herein. A platform such as that described herein may allow for a centralized identity to be generated and used to quickly determine which data should be aggregated at the time that a given user uses an application.

Furthermore, the techniques described herein may include the generation and training of machine learning models to, among other things, generate time sensitive actionable recommendations, interactive elements, application modifications, and to present certain personalizations on the fly. The use of specifically trained machine learning models grounds respective techniques described herein in a computer-centric environment and produces results that offer improvements over conventional technologies. The models may be trained again and again over time, each time learning new parameters or updating parameter weighting to make the results of those models more accurate, more timely, etc.

In addition to the above, the techniques described herein are grounded in the modification and adaptation of computer applications hosted across various devices and systems. Modification of computer applications, particularly on the fly and based on ever-changing user-related data across multiple disparate resources, is necessarily not a mental process and not a method of organizing human activity. Indeed, absent the computer-centric solutions described herein, users would be constrained to a more typical application experiences with generalized, non-user-specific personalizations, if any.

It should be noted that the exchange of data and/or information as described herein may be performed where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed where a user has provided consent for performance of the operations.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment 100 for personalization of data presentation utilizing a centralized identity, according to an embodiment described herein. The environment 100 of FIG. 1 may include a user 101 associated with a user device 102 and a payment service 104, which can communicate via network(s) 106. A user 101 can be any customer that initiates a transaction as described herein or the user 101 may be any other entity such as a merchant. Each of the devices depicted in FIG. 1 can comprise one or more computing devices. Additional details associated with the user device 102, the payment service 104, and the network(s) 106 are described below with reference to FIGS. 10-14.

The user device 102 may include one or more components such as one or more processors 108, one or more network interfaces 110, computer-readable media (CRM) 112, one or more microphones 114, one or more speakers 116, and one or more displays 118. The microphones 114 may be configured to receive audio input from the environment 100 and to generate corresponding audio data, which may be utilized as discussed herein. The speakers 116 may be configured to output audio, such as audio associated with a given transaction. The displays 118 may be configured to present graphical user interfaces. In some examples, the displays 118 can output images, videos, or the like via such graphical user interfaces.

The CRM 112 may include one or more applications or other components. For example, the one or more applications or other components can include one or more user interface(s) 120 and a payment application 122. A user interface 120 can be included in the payment application 122 as an interstitial, widget, or pop-up display. The CRM 112 can include additional or alternative applications such as a music streaming application, a messaging application, an email application, a forum application, a photo application, or the like. In some examples, the applications can be provided by a same service provider (e.g., the payment service) or different service providers, such as the payment service and one or more third-party service providers.

The applications or other components may be configured to execute in the foreground and background of the device 102. For example, the payment application 122 may be configured to execute in the foreground when a user is actively engaged in one or more of the functionalities of the payment application 122. In other examples, the payment application 122 may be configured to execute in the background when a user is not actively engaged in one or more of the functionalities, but the payment application 122 is still "open" and is capable of communicating with other applications on the device 102 and/or with payment service 104 associated with the payment application 122. For example, a web browser application may be executing in the foreground and an interaction with an interactive element as described in more detail herein may occur. The payment application 122, running in the background, may be caused to be displayed in the foreground in response to selection of the interactive element in the web browser application. In some such examples, the payment application 122 can transition to the foreground to perform payment operations or can remain in the background and payment operations can be performed without the payment application 122 transitioning to the foreground. In other examples, the payment application 122 itself may be utilized to display interactive elements associated with centralized identities and application personalizations as described herein. It should be understood that the user interfaces 120 described herein may include the payment application 122 and may include one or more other user interfaces as described herein. It should also be understood that the payment application 122 or the functionality associated therewith can be integrated other applications, such as third-party applications.

The payment service 104, which can be associated with one or more computing devices, such as server computing devices, may include components such as one or more processors 124, one or more network interfaces 126, and/or CRM 128. The CRM 128 may include one or more components such as, for example, datastore(s) 130, an interactive element component 132, one or more accounts 134, a payment component 136, one or more machine learning models 138, one or more application programming interfaces (APIs) 140, an identification component 142, a data association component 144, and an application modification component 146. These components will be described below by way of example.

In at least one example, the payment service 104 can expose functionality and/or services via the one or more APIs 140, thereby enabling functionality and/or services described herein to be integrated into various functional components of the environment 100. The API(s) 140, which can be associated with the payment service 104, can expose functionality described herein and/or avail payment services to various functional components associated with the environment 100. At least one of the API(s) 140 can be a private API, thereby availing services and/or functionalities to functional components (e.g., applications, etc.) that are developed internally (e.g., by developers associated with the payment service). At least one of the API(s) 140 can be an open or public API, which is a publicly available API that provides third-party developers (e.g., photograph platforms described herein) with programmatic access to a proprietary software application or web service of the payment service. That is, the open or public API(s) can enable functionality and/or services of the payment service to be integrated into one or more applications. The API(s) 140 can include sets of requirements that govern how applications, or other functional components, can interact with one another.

In some examples, the payment service 104 can provide third-party entities with a software developer kit ("SDK") that may utilize functionality exposed by the API(s) 140. The SDK can include software development tools that allow a third-party developer (i.e., a developer that is separate from the payment service) to include functionality and/or avail services as descried herein. The SDK and/or the API(s) 140 may include one or more libraries, programming code, executables, other utilities, and documentation that allows a developer to directly include functionality and/or avail services described herein within an application.

The datastore(s) 130 can store, among other types of data, user profiles. For instance, a user profile of the user can store payment data associated with payment instrument(s) or user account(s) of a user. In some examples, an account maintained by the payment service 104 on behalf of the user can be mapped to, or otherwise associated with, the user profile. Such an account can be associated with a stored balance maintained by the payment service 104. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile, which can be associated with different assets, such as stocks, cryptocurrency, non-fungible tokens, or the like. In some examples, a user profile can include historical group data, geographic data, customer preferences, subject matter preferences, transaction data, contacts data, social relationship data, user preferences, metadata tag data, and other information associated with participation in the transactions described herein. Additional details associated with data that can be stored in association with user profiles are provided below, but may include the user-related data described herein as well as the user identifiers.

In some examples, a transaction as described herein can be associated with a metadata tag representative of the transaction. In some examples, the metadata tag can be used in lieu of payment data to make a payment to the transaction. In some examples, transactions can be represented by data objects that are stored in the datastore(s) 130. Such data objects can be used for tracking states associated with such transactions. In some examples, such data objects can be associated with one or more balances from which funds can be transferred or into which funds can be received using the ledger system as described herein. In some examples, transactions can be associated with "pages" that can be presented via user interfaces 120 of user devices, for example, via the payment application 122. In some examples, such "pages" can provide information about the transaction and can include one or more interactive elements to utilize certain functionality associated with the transaction.

With respect to the identification component 142, it may be configured to query one or more resources for identification data associated with user identifiers stored by the resources. In an example, the payment service 104 may have access to three resources (i.e., Resource A 148. Resource B 150, and Resource C 152). Each of these resources may be associated with various devices, systems, and databases that may store data associated with various user identifiers. In some examples, the payment service 104 itself may be a resource, as illustrated in FIG. 1. The identification data may be returned to the identification component 142, which may determine whether similarities in the identification data are present across datasets for the various resources. Identification data may include, for example, usernames, contact information, payment instrument information, geographic location information, etc. The identification component 142 may be configured to utilize this identification data to generate a similarity metric that indicates how similar identification data from a given resource is with respect to identification data from another resource. When the similarity metric satisfies a threshold similarity, the identification component 142 may determine that user identifiers associated with the multiple resources correspond to the same user.

As shown in FIG. 1. Resource A 148 is depicted as being associated with multiple computing devices, such as devices associated with merchants. While three such computing devices are depicted in FIG. 1 as being related to Resource A 148, the number of computing devices may be one, two, three, or more than three. Additionally, Resource B 150 is depicted as being associated with multiple remote systems, such as systems associated with rewards programs, payment processing services, shopping and marketplace services, etc. While six such remotes systems are depicted in FIG. 1 as being related to Resource B 150, the number of remote systems may be one, two, three, four, five, sixth, or more than six. Additionally, Resource C 152 is depicted as being associated with a single personal device, such as a phone or tablet. While one such device is depicted in FIG. 1 as being related to Resource C 152, the number of devices may be one or more than one. It should also be understood that while FIG. 1 depicts each resource as being associated with a given type of device (i.e., Resource A 148 is depicted as being associated with only computer devices while Resource B 150 is depicted as being associated with only remote systems), any of the resources may be associated with any device and system that is configured to communicate with the payment service 104 and to generate or store any data associated with a given user. Additionally, while only three resources are shown, the resources may be any number, and in examples the payment service 104 may not be only of the resources.

Thereafter, the identification component 142 may be configured to generate a centralized identity that maps to the user identifiers of the various resources. For example. Resource A 148 may be associated with a first user identifier determined to be associated with a given user 101. Resource B 150 may be associated with a second user identifier determined to be associated with the user 101, and Resource C 152 may be associated with a third user identifier determined to be associated with the user 101. The centralized identity may be generated and stored in association with the payment service 104. The centralized identity may indicate a mapping between the centralized identity and the various user identifiers, in this example being the first user identifier from Resource A 148, the second user identifier from Resource B 150, and the third user identifier from Resource C 152. It should also be understood that while this example illustrates that one user identifier is associated with each resource, each of the resources may be associated with more than one user identifier.

In some examples, modeling may be utilized by the identification component 142 to determine when a newly added identity is duplicative of an already present identity for a given user. In examples where the newly added identity is a duplicate of an already present identity, the identification component 142 may identify which of the multiple identities to utilize and may aggregate data from each identity. This may enable a centralized identity for merchants with whom users transact and enables the payment service 104 to efficiently and accurately summarize data. To determine whether identities are duplicative, the identification component 142 may determine similarities in identification fields for given identities, such as user names, addresses, telephone numbers, payment card identifiers, shipping details, etc. In these examples, the modeling may utilize machine learning models 138 as described in more detail with respect to FIG. 9.

The data association component 144 may be configured to receive an indication of the generation of the centralized identity and may perform operations to associate the centralized identity with data from the various resources that are associated with the individual user identifiers. In an example, associating the centralized identity with user-related data from the individual resources may include flagging a portion of the data stored in association with the user's user identifier in a given resource as data that is associated with the centralized identity.

Using the example above, a portion of the data stored by Resource A 148 that is associated with the first user identifier may be flagged as corresponding to the centralized identity, a portion of the data stored by Resource B 150 that is associated with the second user identifier may be flagged as corresponding to the centralized identity, and a portion of the data stored by Resource C 152 that is associated with the third user identifier may be flagged as corresponding to the centralized identity. This data association technique may allow the payment service 104 to query the various resources for user-related data by utilizing the centralized identity as the searching implement. In this example, an instance of the queried data may be returned to the payment service 104, which may aggregate the data from the various resources, format the data such that it is cohesive and thus can be utilized, and then utilize the user-related data for one or more purposes, including the personalization of data presentation to the user 101. In examples, flagging of data as described herein may include storing an indicator of the centralized identity in a record for some or all transactions associated with the centralized identity. In other examples, the resource at issue may be caused to store a mapping between centralized identities and resource-specific user identifiers such that then the resource at issue receives a request for data associated with the centralized identity, the resource utilizes the mapping to convert the resource-specific identifier and then searches for user-related data using the resource-specific identifier.

In another example, the data association component 144 may be configured to request an instance of the user-related data from the various resources and may aggregate and store that user-related data in association with the centralized identity. In this example, the payment service 104 may act as a user-related data storage mechanism and may not necessarily need to query the resources at issue when an action associated with the user 101 is to be performed. Instead, the centralized identity may be utilized to query the payment service database, such as one of more of the datastores 130, for the aggregated user-related data, which may be utilized as described herein.

Once a centralized identity is generated as described herein, the centralized identity may be utilized to acquire user-related data from across the various resources for one or more purposes, including personalization of data presentation. To do so, the application modification component 146 may be configured to receive the user-related data and determine if the user-related data indicates that one or more personalizations can be applied to a given application. To do so, the application modification component 146 may determine whether user-related data is similar across multiple resources. Examples of such user-related data may include transaction data, user preference data, payment instrument data, user identifier data, and other data that may be associated with a given user 101. Depending on whether the user-related data is similar across the various resources, the application modification component 146 may determine how personalizations should be applied.

In examples where the user-related data is similar in one or more respects across multiple resources, the application modification component 146 may identify that similar data and may determine one or more personalizations based on that similar data. In one example, the similar data may include the purchase of specific items, the use or availability of specific incentives, the use of specific user preferences, etc. In these examples, the application modification component 146 may determine that an application being utilized by the user should be modified to display items in an order based on the user-related data. In other examples, an item that is offered for sale that was purchased across multiple resources by the user 101, or that was recommended across multiple resources, or that is associated with incentives across multiple resources, or that is associated with a given user preference across resources may be a strong signal that such an item should be highlighted or otherwise ranked more favorably when presented to a user 101. By determining whether the user-related data is similar across multiple resources, the payment service 104 may determine that such data is likely a strong signal of user preferences and user interactions with the various resources.

In another example, the presence of incentives across multiple resources may be aggregated by the application modification component 146 such that the incentives may be displayed together in the same user interface 120. In another example, scheduling data across multiple resources may be aggregated and displayed in the same user interface 120, and that user interface 120 may be modified to display targeted availability options for a given service in light of the scheduling data. In yet another example, transaction data across multiple resources may indicate that the user 101 purchases items having certain characteristics in association with those multiple resources, and the application at issue may be modified to display those item details. In another example, the user-related data may indicate multiple payment methods available to the user 101 across the multiple resources, and these payment methods may be aggregated such that the application at issue is caused to display all of these options in a given user interface 120. Additional personalizations may include the auto-population of information in a given application, the generation of affiliate links for user selection, and the availability of single use payment instruments.

In other examples where certain user-related data is not similar across the multiple resources but is still associated with the user 101 in question, the application modification component 146 may be configured to determine a set of personalizations from the user-related data from each resource. When the personalizations do not conflict, the personalizations may be aggregated and utilized to modify the application being used by the user 101. However, in examples where a personalization of a given set of personalizations conflicts with another personalization in another set of personalizations, the application modification component 146 may arbitrate between the personalizations to determine which personalizations to apply (or whether to not apply a given personalization). By so doing, the techniques described herein may be able to parse disparate data sources for user-related information on the fly and based on the application currently being utilized to dynamically modify the application such that personalizations are applied from the user-related data.

In some examples, machine learning techniques may be utilized to facilitate the operations described herein. For example, a machine learning model 138 may be generated and configured to utilize, as input, some or all of the user identifiers or user-related data to determine which user identifiers apply to a given user 101, which user-related data is associated with a given centralized identity, which personalizations should be selected, etc. The machine learning model 138 may be trained utilizing a training dataset that indicates prior results of the machine learning model 138 and feedback data indicating the accuracy or desirability of the results. A machine-trained model 138 may be generated using the training dataset, and the machine-trained model 138 may be utilized to perform the operations described above. In these examples, a number of factors determined to be relevant by the machine-trained model 138 may be utilized to determine user identifier similarities, user-related data similarities, and personalization desirability. Additional details on the use of machine learning techniques to determine items and merchants is described below with respect to FIG. 9.

In examples, the user interfaces 120 described herein may be described as displaying functionality to allow for user interaction. That functionality may be provided utilizing one or more interactive elements. The interactive element component 132 may generate these interactive elements that may be configured to be shared and displayed in the payment application 122 and outside of the payment application 122, such as on one or more social media applications, email applications, messaging applications, merchant applications, etc. The interactive element can correspond to a link, a deep link, a bar code, a QR code, or any other element that is capable of interaction. In some examples, the interactive element can have data embedded therein to trigger certain functionality, such as the display of information, initiation of a transaction, navigation to another application or ecommerce website, etc. The functionality may be particularly robust and may update on-the-fly to provide users with real-time information about the transaction at issue.

The payment component 136 may be utilized by the payment service 104 to facilitate one or more payments associated with the payment application 122 or a merchant ecommerce website. In at least some of the examples above, the personalizations may be associated with payment options, auto-population of payment information, or the automatic payment for items purchased. The payment component 136 may receive data indicating these personalizations, and the payment component 136 may utilize this data to withdraw funds from an account 134 of the user 101 in question and to deposit those funds into an account 134 of a merchant at issue. In addition to the above, the payment component 136 and the accounts 134 described herein may store the user-related data that is utilized to apply the personalizations described herein.

In some implementations, the methods and systems described herein can be integrated with voice services (e.g. Amazon's ALEXA R. Apple's SIRI®, or Microsoft's COR-TANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein.

Figure 2A:
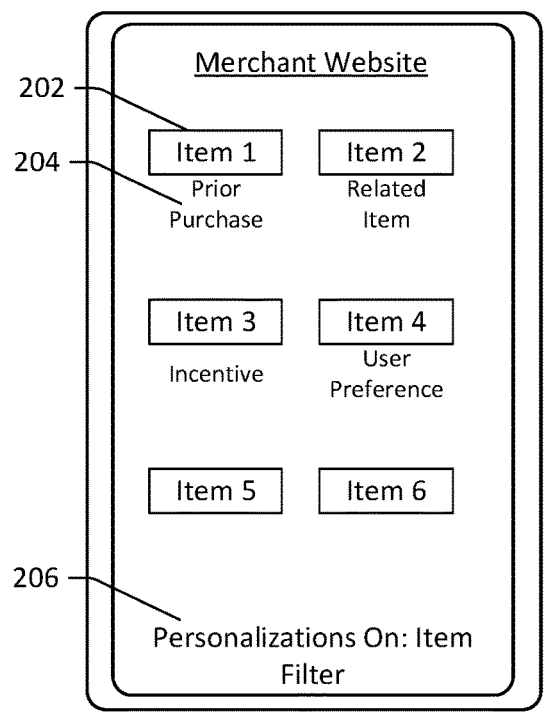
FIG. 2A is an example user interface displayed on an example user device, where the user interface is configured to present personalizations associated with item filtering, according to an embodiment described herein.

FIG. 2A is an example user interface displayed on an example user device, where the user interface is configured to present personalizations associated with item filtering, according to an embodiment described herein. The user interface described in FIG. 2A may be one of the user interfaces 120 described with respect to FIG. 1. The user device described in FIG. 2A may be the same or similar to the user device 102 described with respect to FIG. 1.

As shown in FIG. 2A, a centralized identity may have been generated and associated with a given user. User-related data associated with the centralized identity may be queried from multiple resources with user identifiers that are associated with the centralized identity. An application modification component, which may be similar to the application modification component 146 described with respect to FIG. 1, may be utilized to determine one or more personalizations to apply to a given application based at least in part on the user-related data.

With respect to the user interface depicted in FIG. 2A, the application at issue may be associated with a merchant website (e.g., an ecommerce website), a payment application (e.g., a merchant or other user profile or the like), or otherwise a platform that displays items for sale by a given merchant or a set of merchants. The user interface may include one or more item indicators 202 as well as a personalization indicator 204. In this example, the personalization applied to the application may be to rank or otherwise organize display of the item indicators 202 based at least in part on the user-related data. In the example of FIG. 2A, Item A is displayed first, Item 2 is displayed second, etc. Additionally, in some examples, the personalization indicator 204 may be displayed that provides the user with information on why Item 1 was displayed in the order presented to the user.

The personalization indicator 204 for Item 1 indicates, in this example, that prior purchase information gathered from multiple resources utilizing the centralized identity indicates that the user has previously purchased this item multiple times or has otherwise provided user input determined to express interest in the item. The personalization indicator 204 for Item 2 indicates, in this example, that the user-related data gathered from multiple resources utilizing the centralized identity was utilized to determine that Item 2 was related to one or more previously-purchased items. As for Item 3, the personalization indicator 204 may indicate that Item 3 was displayed as shown based at least in part on incentive information acquired from the multiple resources utilizing the centralized identity. As for Item 4, the personalization indicator 204 may indicate that Item 4 was displayed as shown based at least in part on user preference information acquired from the multiple resources utilizing the centralized identity.

Also, as shown in FIG. 2A, one or more of the items (here Item 5 and Item 6) may not be associated with a personalization indicator 204. This may show the user in question that no personalizations associated with those items were utilized. It should be understood that while several example personalization indicators 204 are described with respect to FIG. 2A, those personalization indicators 204 are provided by way of example. The payment service may utilize any user-related data to generate any personalizations or may utilize any user-related data to rank or otherwise organize display of items.

In addition to the above, the user interface may include a personalization category indicator 206. The personalization category indicator 206 may provide information about what personalizations have been applied to the application at issue or how the application has been modified based on the personalizations. With respect to FIG. 2A, the personalization category indicator 206 may show that personalizations are "on" and what the personalization category is. Here, the personalization category is displayed as an "item filter," which may indicate to the user that the items being displayed have been filtered or otherwise organized based on the personalizations that were applied to the application.

Figure 2B:
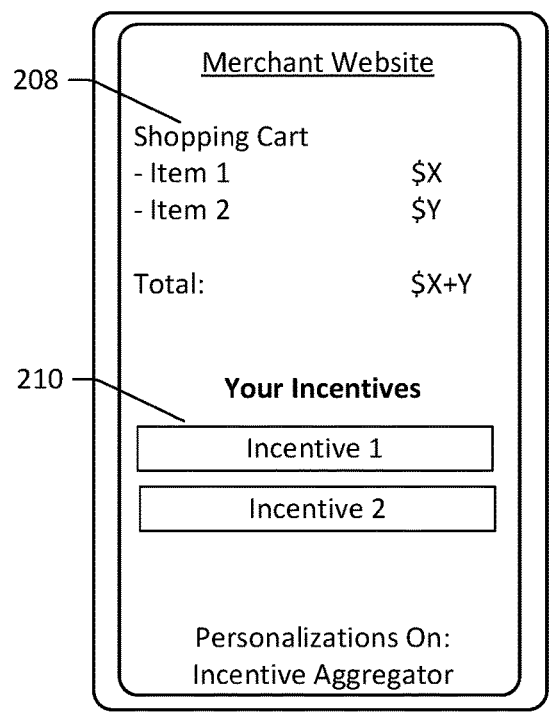
FIG. 2B is an example user interface displayed on an example user device, where the user interface is configured to present personalizations associated with incentive aggregations, according to an embodiment described herein.

FIG. 2B is an example user interface displayed on an example user device, where the user interface is configured to present personalizations associated with incentive aggregations, according to an embodiment described herein. The application at issue may be associated with a merchant website (e.g., an ecommerce website), a payment application (e.g., a merchant or other user profile or the like), or otherwise a platform that displays items for sale by a given merchant or a set of merchants. The user interface described in FIG. 2B may be one of the user interfaces 120 described with respect to FIG. 1. The user device described in FIG. 2B may be the same or similar to the user device 102 described with respect to FIG. 1.

As shown in FIG. 2B, a centralized identity may have been generated and associated with a given user. User-related data associated with the centralized identity may be queried from multiple resources with user identifiers that are associated with the centralized identity. An application modification component, which may be similar to the application modification component 146 described with respect to FIG. 1, may be utilized to determine one or more personalizations to apply to a given application based at least in part on the user-related data.

With respect to the user interface depicted in FIG. 2B, the application at issue may be a merchant website or otherwise a platform that displays items for sale by a given merchant or a set of merchants. The user interface may include an order summary 208. The order summary 208 may provide an indication of what items the user has selected for purchase as well as a price for the individual items. The order summary 208 may also include a total price for the transaction at issue, particularly without one or more incentives, such as discounts, being applied.

In the example of FIG. 2B, one or more incentives 210 may be displayed as a personalization to the merchant website. In this example, the centralized identity may be utilized by the application modification component to identify multiple incentives across multiple resources. In a particular example, Incentive 1 as displayed in FIG. 2B may have been determined as available from a first resource and Incentive 2 may have been determined as available from a second resource. These incentives may be aggregated and the application modification component may determine whether the incentives are applicable to the transaction at issue. This determination may be based at least in part on the merchant at issue, the application at issue, the items at issue, timing of the transaction, etc. The incentives 210 may be displayed on the user interface and the user may provide user input to select one or more of the incentives 210. Selection of an incentive 210 may cause the user interface to be modified in real time such that the order summary 208 is changed to reflect inclusion of the incentive(s) 210 in the transaction.

As with FIG. 2A, the user interface may include a personalization category indicator 206. The personalization category indicator 206 may provide information about what personalizations have been applied to the application at issue or how the application has been modified based on the personalizations. With respect to FIG. 2B, the personalization category indicator 206 may show that personalizations are "on" and what the personalization category is. Here, the personalization category is displayed as an "incentive aggregator," which may indicate to the user that incentives have been identified from the resources and indicators of those incentives are being displayed on the user interface.

Figure 2C:
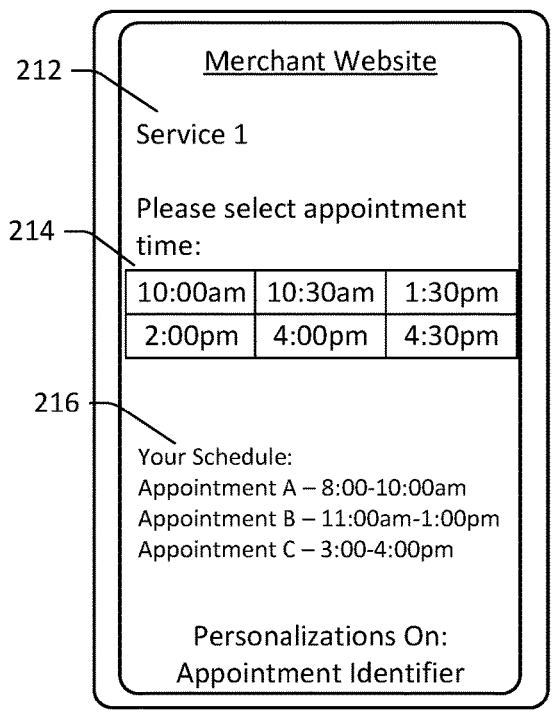
FIG. 2C is an example user interface displayed on an example user device, where the user interface is configured to present personalizations associated with appointment identifiers, according to an embodiment described herein.

FIG. 2C is an example user interface displayed on an example user device, where the user interface is configured to present personalizations associated with appointment identifiers, according to an embodiment described herein. The application at issue may be associated with a merchant website (e.g., an ecommerce website), a payment application (e.g., a merchant or other user profile or the like), or otherwise a platform that displays items for sale by a given merchant or a set of merchants. The user interface described in FIG. 2C may be one of the user interfaces 120 described with respect to FIG. 1. The user device described in FIG. 2C may be the same or similar to the user device 102 described with respect to FIG. 1.

As shown in FIG. 2C, a centralized identity may have been generated and associated with a given user. User-related data associated with the centralized identity may be queried from multiple resources with user identifiers that are associated with the centralized identity. An application modification component, which may be similar to the application modification component 146 described with respect to FIG. 1, may be utilized to determine one or more personalizations to apply to a given application based at least in part on the user-related data.

With respect to the user interface depicted in FIG. 2C, the application at issue may be a merchant website or otherwise a platform that displays items for sale by a given merchant or a set of merchants. The user interface may include a service indicator 212, which may provide a visual representation of a service requested by the user that is offered by the merchant in question. Additionally, the user interface may include a scheduling element 214, which may display available time periods for scheduling the service indicated by the service indicator 212. As shown in FIG. 2C, the scheduling element 214 includes only six available time slots for scheduling the service at issue.

While in an example scheduling experience, display of available time slots may be based solely on a merchant's availability to provide the service, in FIG. 2C, the personalizations described herein may be applied such that the scheduling element 214 is updated to reflect the customer's availability along with the merchant's availability. To that end, the user interface may include a user schedule 216, which may be generated from the user-related information gathered utilizing the centralized identity of the user. Indicators of appointments or otherwise scheduling conflicts may be displayed in the user schedule 216, and those scheduling conflicts may be applied to the scheduling element 214 to restrict the options presented to the user. Here, given that the user has appointments from 8:00 am to 10:00 am, from 11:00 am to 1:00 pm, and from 3:00 pm to 4:00 pm on the day in question, the scheduling element 214 may be modified such that available time slots for booking the service do not conflict with the user's schedule as determined utilizing the centralized identity.

As with FIG. 2A, the user interface may include a personalization category indicator 206. The personalization category indicator 206 may provide information about what personalizations have been applied to the application at issue or how the application has been modified based on the personalizations. With respect to FIG. 2C, the personalization category indicator 206 may show that personalizations are "on" and what the personalization category is. Here, the personalization category is displayed as an "appointment identifier," which may indicate to the user that scheduling data is being utilized to modify the application such that service availability is restricted based on the user's schedule.

Figure 2D:
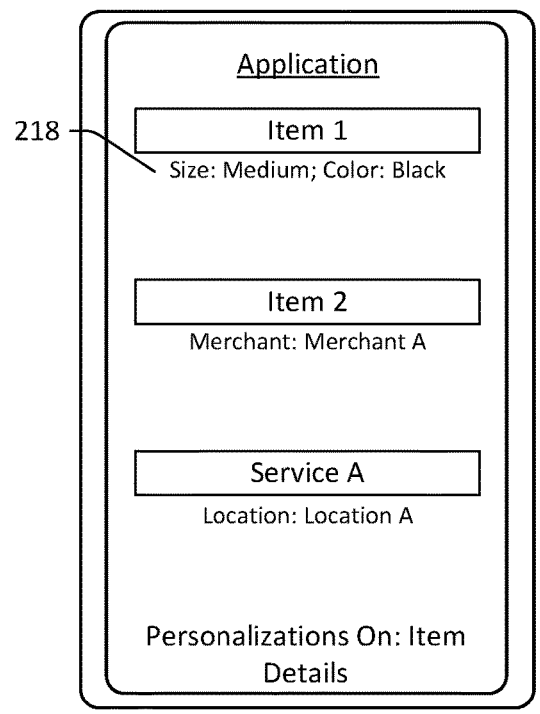
FIG. 2D is an example user interface displayed on an example user device, where the user interface is configured to present personalizations associated with item details, according to an embodiment described herein.

FIG. 2D is an example user interface displayed on an example user device, where the user interface is configured to present personalizations associated with item details, according to an embodiment described herein. The user interface described in FIG. 2D may be one of the user interfaces 120 described with respect to FIG. 1. The user device described in FIG. 2D may be the same or similar to the user device 102 described with respect to FIG. 1.

As shown in FIG. 2D, a centralized identity may have been generated and associated with a given user. User-related data associated with the centralized identity may be queried from multiple resources with user identifiers that are associated with the centralized identity. An application modification component, which may be similar to the application modification component 146 described with respect to FIG. 1, may be utilized to determine one or more personalizations to apply to a given application based at least in part on the user-related data.

With respect to the user interface depicted in FIG. 2D, the application at issue may be a payment application, such as the payment application 122 described with respect to FIG. 1. The user interface may include a list of items as well as item details 218 that are provided with respect to one or more of the items. In this example, the item details 218 may be presented as a personalization to the user interface using the user-related data acquired from multiple resources using the centralized identity. For example, the user-related data may indicate that the user frequently purchases items having certain characteristics, such as size, color, price, etc. or where the items are frequently purchased from a given merchant or set of merchants or from a given location. This information may be utilized by the application modification component to present the user with these item details when available with respect to the items. This personalization of the user interface may allow the user to see the item details on the fly without having to manually input those details to determine if the item is available with those specific details.

As with FIG. 2A, the user interface may include a personalization category indicator 206. The personalization category indicator 206 may provide information about what personalizations have been applied to the application at issue or how the application has been modified based on the personalizations. With respect to FIG. 2D, the personalization category indicator 206 may show that personalizations are "on" and what the personalization category is. Here, the personalization category is displayed as "item details," which may indicate to the user that the item details being displayed have been added to the user interface based on the user-related data gather from the multiple resources using the centralized identity.

Figure 2E:
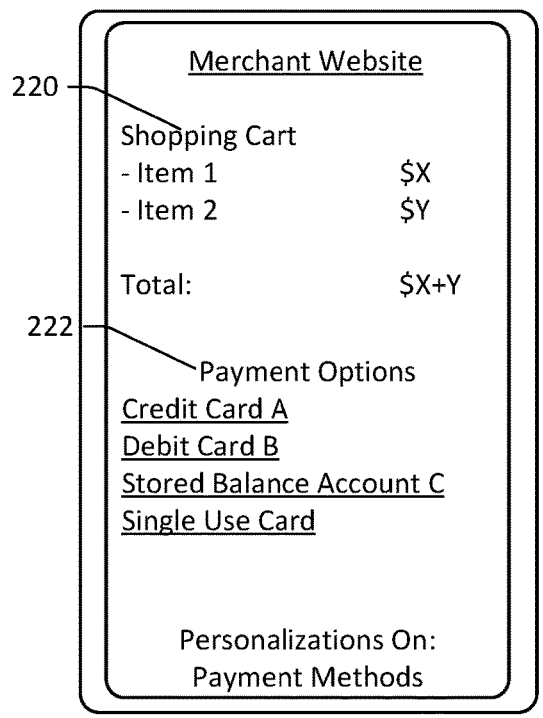
FIG. 2E is an example user interface displayed on an example user device, where the user interface is configured to present personalizations associated with payment methods, according to an embodiment described herein.

FIG. 2E is an example user interface displayed on an example user device, where the user interface is configured to present personalizations associated with payment methods, according to an embodiment described herein. The application at issue may be associated with a merchant website (e.g., an ecommerce website), a payment application (e.g., a merchant or other user profile or the like), or otherwise a platform that displays items for sale by a given merchant or a set of merchants. The user interface described in FIG. 2E may be one of the user interfaces 120 described with respect to FIG. 1. The user device described in FIG. 2E may be the same or similar to the user device 102 described with respect to FIG. 1.

As shown in FIG. 2E, a centralized identity may have been generated and associated with a given user. User-related data associated with the centralized identity may be queried from multiple resources with user identifiers that are associated with the centralized identity. An application modification component, which may be similar to the application modification component 146 described with respect to FIG. 1, may be utilized to determine one or more personalizations to apply to a given application based at least in part on the user-related data.

With respect to the user interface depicted in FIG. 2E, the application at issue may be a merchant website or otherwise a platform that displays items for sale by a given merchant or a set of merchants. The user interface may include an order summary 220. The order summary 220 may provide an indication of what items the user has selected for purchase as well as a price for the individual items. The order summary 220 may also include a total price for the transaction at issue, particularly without one or more incentives, such as discounts, being applied.

Additionally, the user interface may include one or more payment options 222. Generally, payment options 222 available to a user on a merchant website may be to simply enter credit card information, enter gift card information, or otherwise options that are not specific to the user in question. Utilizing the personalizations described herein, the application may be modified such that the payment options 222 are specific to the user. In FIG. 2E, the payment options 222 include Credit Card A that is specific to the user. Debit Card B that is specific to the user, use of a stored balance account associated with the user, or use of a single use card authorized for use by the user. These payment options 222 may be determined utilizing the user-related data across the multiple resources, such that payment methods used across those resources are aggregated and displayed in the user interface.

As with FIG. 2A, the user interface may include a personalization category indicator 206. The personalization category indicator 206 may provide information about what personalizations have been applied to the application at issue or how the application has been modified based on the personalizations. With respect to FIG. 2E, the personalization category indicator 206 may show that personalizations are "on" and what the personalization category is. Here, the personalization category is displayed as "payment methods." which may indicate to the user that the payment options being displayed have been determined from the user-related data associated with the multiple resources using the centralized identity.

In examples, when a user accesses a merchant's website utilizing the payment application described herein, the payment service may prioritize login and payment functionality from the payment application over other payment methods that exist on the merchant website. To do so, a JavaScript API that allows for communication between the in-application browser and the payment service may be utilized such that the payment service may bypass one or more authentication operations given that the experience originates in the payment application. The payment service may also provide the merchant with customer data, such as to create a merchant account, for those customers who access the website at issue and pay to incentivize merchants to create a merchant profile in association with the payment service that directs customers to merchant ecommerce websites.

Figure 2F:
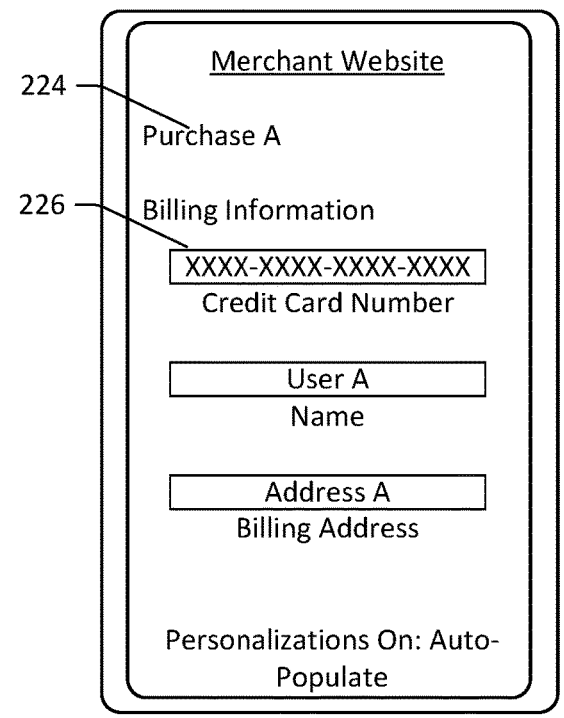
FIG. 2F is an example user interface displayed on an example user device, where the user interface is configured to present personalizations associated with auto-population of user information, according to an embodiment described herein.

FIG. 2F is an example user interface displayed on an example user device, where the user interface is configured to present personalizations associated with auto-population of user information, according to an embodiment described herein. The application at issue may be associated with a merchant website (e.g., an ecommerce website), a payment application (e.g., a merchant or other user profile or the like), or otherwise a platform that displays items for sale by a given merchant or a set of merchants. The user interface described in FIG. 2F may be one of the user interfaces 120 described with respect to FIG. 1. The user device described in FIG. 2F may be the same or similar to the user device 102 described with respect to FIG. 1.

As shown in FIG. 2F, a centralized identity may have been generated and associated with a given user. User-related data associated with the centralized identity may be queried from multiple resources with user identifiers that are associated with the centralized identity. An application modification component, which may be similar to the application modification component 146 described with respect to FIG. 1, may be utilized to determine one or more personalizations to apply to a given application based at least in part on the user-related data.

With respect to the user interface depicted in FIG. 2F, the application at issue may be a merchant website or otherwise a platform that displays items for sale by a given merchant or a set of merchants. The user interface may include a purchase indicator 224, which may provide details on the purchase at issue. Additionally, the user interface may include billing information fields 226, which may be utilized to enter billing information to satisfy a cost of the transaction at issue. Generally, a user may type in the billing information into the appropriate fields to initiate a transfer of funds using that billing information. In certain examples, when the same or similar fields have been used to provide input on a given device previously, the user may start providing user input and an option to auto-populate the remainder of the input may be provided. However, in the examples described herein, the user-related data may be utilized to personalize when the billing information or any other field in an application should be auto-populated without receiving initial user input to do so. In the case of FIG. 2F, a credit card number, name, and billing address indicated by the user-related data to have been used across resources may be determined and auto-populated into respective fields without user input to do so.

As with FIG. 2A, the user interface may include a personalization category indicator 206. The personalization category indicator 206 may provide information about what personalizations have been applied to the application at issue or how the application has been modified based on the personalizations. With respect to FIG. 2F, the personalization category indicator 206 may show that personalizations are "on" and what the personalization category is. Here, the personalization category is displayed as "auto-populate." which may indicate to the user that certain information displayed in the user interface has been auto-populated from the user-related data associated with the multiple resources using the centralized identity.

Figure 2G:
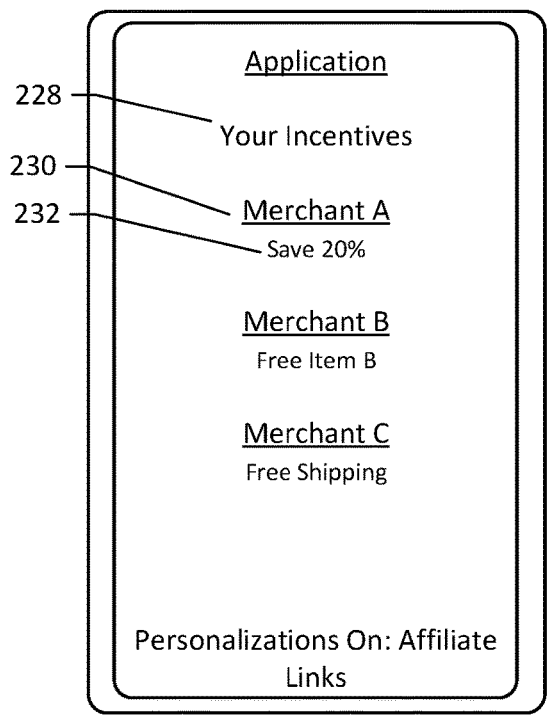
FIG. 2G is an example user interface displayed on an example user device, where the user interface is configured to present personalizations associated with affiliate linking, according to an embodiment described herein.

FIG. 2G is an example user interface displayed on an example user device, where the user interface is configured to present personalizations associated with affiliate linking, according to an embodiment described herein. The user interface described in FIG. 2G may be one of the user interfaces 120 described with respect to FIG. 1. The user device described in FIG. 2G may be the same or similar to the user device 102 described with respect to FIG. 1.

As shown in FIG. 2G, a centralized identity may have been generated and associated with a given user. User-related data associated with the centralized identity may be queried from multiple resources with user identifiers that are associated with the centralized identity. An application modification component, which may be similar to the application modification component 146 described with respect to FIG. 1, may be utilized to determine one or more personalizations to apply to a given application based at least in part on the user-related data.

With respect to the user interface depicted in FIG. 2G, the application at issue may be a payment application, such as the payment application 122 described with respect to FIG. 1. The user interface may include an incentive list 228, which may include indicators of multiple incentives that the user is associated with across the multiple resources described herein. The user interface may also include merchant identifiers 230, which may identify a given merchant that a given incentive is associated with. Additionally, the user interface may include incentive details 232, which may provide an overview of what a given incentive is and how it may be applied to the merchant in question. These incentives may be aggregated based on the user-related data from the multiple resources.

Additionally, the merchant indicators 230 may be interactive elements described herein as affiliate links. In some examples, the affiliate links can be associated with individual user interface elements representative of discounts or incentives, search results, user profiles, or the like, wherein interaction with such a user interface element can cause an application or website associated with the merchant in question to be displayed in a foreground of the user device and cause the payment application to resolve to a background of the user device. In some examples, interaction with an affiliate link can cause a website of the associated merchant to be presented within the application itself (e.g., in a web container). In such examples, the user need not leave the application to access the merchant website. Generally, affiliate links allow a user to transition between applications or websites hosted by different entities and are traceable such that the originating application or resource can receive a fee (e.g., purchase attribution) for driving the user to the applications or websites hosted by different entities. In some examples, using the personalizations described herein, selection of an affiliate link may cause the affiliated application to launch and may cause the specific incentive at issue to automatically be applied for a transaction conducted in that affiliated application. In some examples, selection of the affiliate link may cause one or more of the other personalizations to occur with respect to the affiliated application such that the affiliated application is modified to present those personalizations. That is, in some examples, because the user accessed the merchant application or website from the payment application, personalization data associated with the user can be accessible to the merchant application or website. Accordingly, payment instrument data, shipping data, user preferences, and/or the like can be used for personalizing the user experience in the merchant application or website.

As described above, in some examples, the use of an affiliate link that results in a transaction can enable the payment service to receive fees that they otherwise may not receive in transactions that originate in the merchant application, on the merchant website, or otherwise outside of the payment application. In some examples, the user can use a particular payment method in which the payment service can avoid one or more fees, for example, if the user uses a stored balance (instead of a payment instrument such as a payment card). In some examples, if the user uses a payment instrument provided by the payment service to complete the transaction from the affiliate link, the payment service can receive additional or alternative fees, such as interchange fees. In such examples, the payment service can then recover an affiliate linking fee, or portion thereof, and interchange fees off of a single transaction. In some examples, if a user does not have a payment instrument provided by the payment service, the payment service can generate a single use payment instrument, as described herein, for use in the transaction. The single use payment instrument can be linked to an account of the user and generated in real-time ("on-the-fly"). The use of the single use payment instrument can enable the payment service to receive additional or alternative fees, such as interchange fees, as a result of the user using the single use payment instrument. In such examples, the payment service can then recover an affiliate linking fee, or portion thereof, and interchange fees off of a single transaction.

As with FIG. 2A, the user interface may include a personalization category indicator 206. The personalization category indicator 206 may provide information about what personalizations have been applied to the application at issue or how the application has been modified based on the personalizations. With respect to FIG. 2G, the personalization category indicator 206 may show that personalizations are "on" and what the personalization category is. Here, the personalization category is displayed as "affiliate links," which may indicate to the user that certain affiliate links are being displayed based on the user-related data associated with the multiple resources using the centralized identity.

Figure 2H:
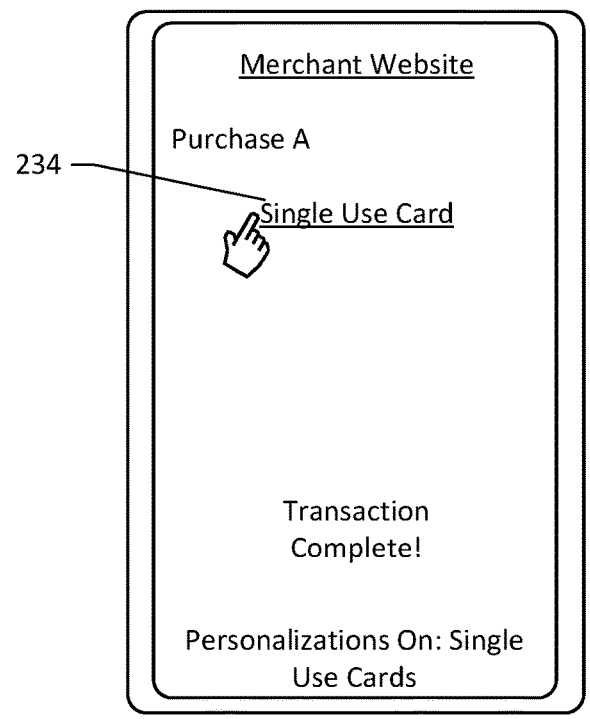
FIG. 2H is an example user interface displayed on an example user device, where the user interface is configured to present personalizations associated with single use payment instruments, according to an embodiment described herein.

FIG. 2H is an example user interface displayed on an example user device, where the user interface is configured to present personalizations associated with single use payment instruments, according to an embodiment described herein. The application at issue may be associated with a merchant website (e.g., an ecommerce website), a payment application (e.g., a merchant or other user profile or the like), or otherwise a platform that displays items for sale by a given merchant or a set of merchants. The user interface described in FIG. 2H may be one of the user interfaces 120 described with respect to FIG. 1. The user device described in FIG. 2H may be the same or similar to the user device 102 described with respect to FIG. 1.

As shown in FIG. 2H, a centralized identity may have been generated and associated with a given user. User-related data associated with the centralized identity may be queried from multiple resources with user identifiers that are associated with the centralized identity. An application modification component, which may be similar to the application modification component 146 described with respect to FIG. 1, may be utilized to determine one or more personalizations to apply to a given application based at least in part on the user-related data.

With respect to the user interface depicted in FIG. 2H, the application at issue may be a merchant website or otherwise a platform that displays items for sale by a given merchant or a set of merchants. The user interface may include a purchase indicator indicating a transaction at issue along with a single use card option 234. The single user card option 234 may be an interactive element that, when selected, causes the payment service to generate a single use payment instrument to be utilized to satisfy a cost of the transaction at issue. The single use payment instrument may include the information necessary for the merchant to conclude a transaction, such as a payment instrument number, a user's name, a billing address, phone number, etc. However, the single user payment instrument may only be authorized for one use in association with just the merchant website at issue, with just the user at issue, and just at the time at issue. The payment service may, when the single use card option 234 is selected, send the single user payment instrument information to the merchant website, which may utilize the information to complete the transaction. Thereafter, if the information is attempted to be utilized again, one or more conditions determined by the payment service may fail and the transaction may be denied or the single use card may not be utilized to satisfy a cost of the transaction. Those conditions may be whether the card has already been used, whether the timing of the request is outside a threshold amount of time from when the single use card was requested originally, whether the merchant is the correct merchant, whether the user device is the correct device, etc. It should be understood that in some examples the "single use card" may be any payment instrument that is usable until some condition is satisfied, such as when a transaction is completed, when a set of transactions are completed, when an amount of funds has been spent when a given date has passed, when a given amount of time has lapsed, etc.

As with FIG. 2A, the user interface may include a personalization category indicator 206. The personalization category indicator 206 may provide information about what personalizations have been applied to the application at issue or how the application has been modified based on the personalizations. With respect to FIG. 2H, the personalization category indicator 206 may show that personalizations are "on" and what the personalization category is. Here, the personalization category is displayed as "single use cards," which may indicate to the user that the single user card option is being displayed based on the user-related data associated with the multiple resources using the centralized identity.

While GUIs represented in 2A-2H are shown and described as including a personalization category indicator 206, in additional or alternative examples, the GUIs may not provide any context with respect to how the content, design, or other information is personalized. That is, a user may not have an idea that the content is being personalized for them. In such examples, presentation of the personalization category indicator 206 may be optional or omitted entirely. In some examples, personalization described with reference to FIGS. 2A-2H can be combined such that one or more personalization categories can be integrated into a single UI presentation and/or sequentially presented UIs.

Figure 3:
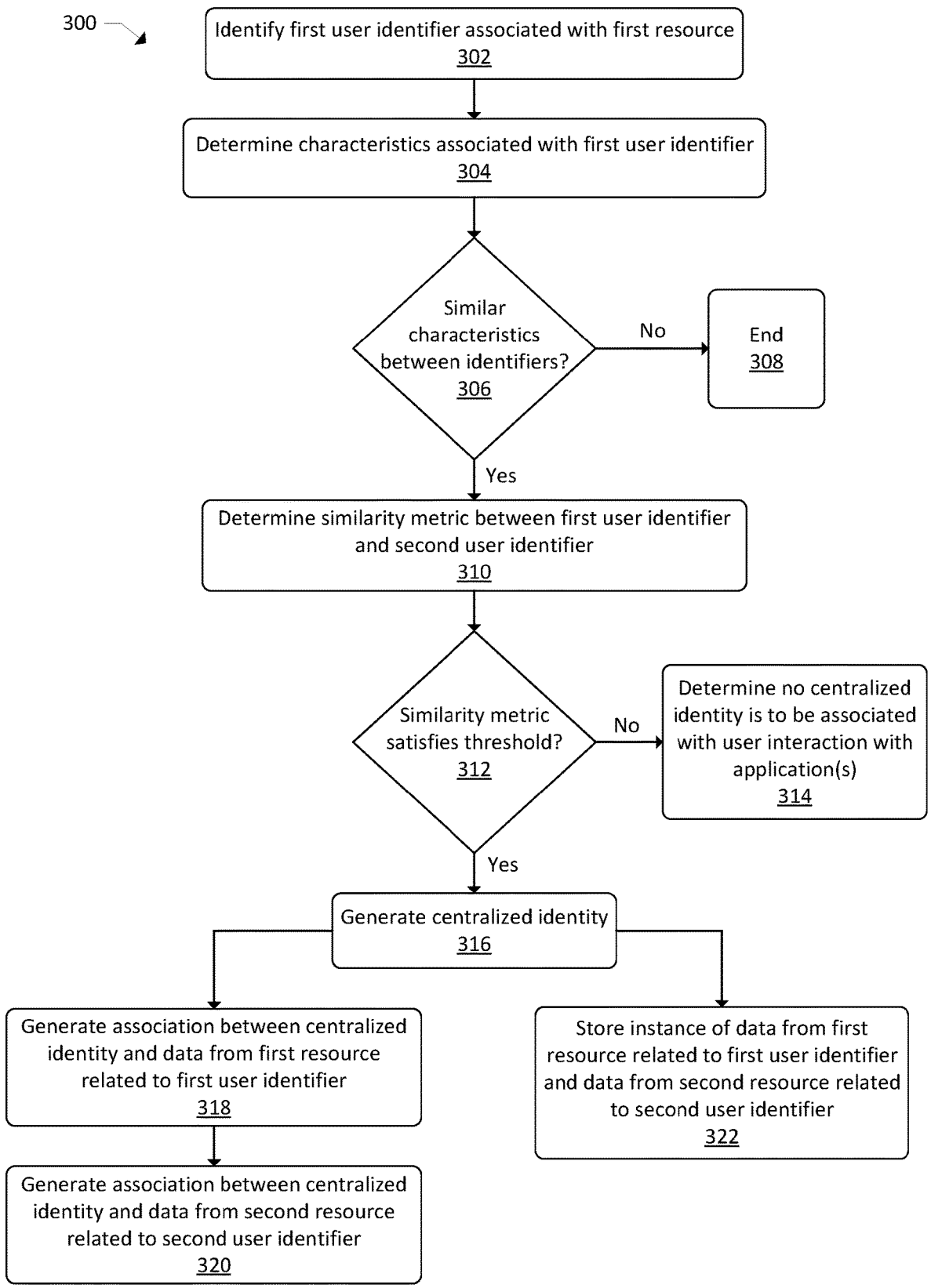
FIG. 3 is a flow diagram of an example process for generating a centralized identity, according to an embodiment described herein.

FIG. 3 includes example processes for generating a centralized identity, according to an embodiment described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-2H and 4-14, although the processes may be implemented in a wide variety of other environments, architectures and systems.

FIG. 3 is a flow diagram of an example process 300 for generating a centralized identity, according to an embodiment described herein. In some examples, the generation of a centralized identity may be performed by an identification component 142 as described with respect to FIG. 1. The order in which the operations or steps are described is not intended to be construed as a limitation, and any number of the described operations may be combined in any order and/or in parallel to implement process 300.

At block 302, the process 300 may include identifying a first user identifier from a first resource. For example, the first resource may include hundreds if not thousands of user identifiers associated with users that have utilized functionality associated with the first resource. An identification component of a payment service may query the resource of the user identifiers such that those user identifiers may be compared with user identifiers from other resources to determine similarities. The resource may store the user identifiers in a list, or as a data object that is searchable by the payment service, such as via one or more APIs. To illustrate, in some examples, the payment service described herein may query the resource for all user identifier data associated with users of the resource. The payment service may then receive the user identifier data and may at least temporarily store the user identifier data at least until a comparison can be performed between the received user identifier data and identifier data from other resources as described with respect to blocks 304 and 306 below. In other examples, the payment service may have access to the user identifier data with respect to the first resource and may query for any given user identifier data when comparing with user identifier data from other resources.

At block 304, the process 300 may include identifying a second user identifier from a second resource. Identifying the second user identifier may be performed in the same or a similar manner as identifying the first user identifier, except that the second resource may be queried instead of the first resource. It should be understood that while the process 300 includes an example where two resources are queried for user identifiers, the process 300 may include querying more than two resources for user identifiers.

At block 306, the process 300 may include determining whether the first user identifier has similar characteristics to the second user identifier. For example, the user identifiers may be compared for identification data that may be similar. The identification data may include, for example, username, contact information, payment instrument information, geographic location information, etc. In certain examples, the identification data as between two given user identifiers from different resources may have no similarity, such as an example where the username, contact information, payment instrument information, geographic location information, and other information has no similarity as between the two user identifiers. In other examples, some but not all of the identification data may be similar in one or more respects.

In examples where the system determines that the first user identifier and the second user identifier do not share similar characteristics, such as to a threshold degree of similarity, the process 300 may end at block 308. In this example, an identification component of the payment service may determine that the first user identifier and the second user identifier are associated with different users and thus creation of a centralized identity would not be helpful, and may be harmful.

In examples where the system determines that the first user identifier and the second user identifier share similar characteristics, the process 300 may include, at block 310, determining a similarity metric between the first user identifier and the second user identifier. The similarity metric may include a score, which may be placed on a scoring scale, that indicates a degree of similarity between identification information as between two user identifiers. The more similar the identification data is as between two user identifiers, the more favorable the similarity metric may be. For example, if two user identifiers include the same name, address, and contact information, the similarity metric may be scored more favorably than if two user identifiers include the same name but the other identification data differs. In examples, machine learning may be utilized with respect to block 310 to determine when a sufficient degree of similar characteristics is present. For example, one or more trained machine learning models may be utilized to weight or otherwise prioritize similarity of given characteristics or may determine that characteristics correspond even if the format, style, etc, of the user identification data differs in some respects.

At block 312, the process 300 may include determining whether the similarity metric satisfies a threshold similarity. For example, the threshold similarity may be determined by the payment service and may be static or dynamic. In some examples, machine learning techniques as described in more detail with respect to FIG. 9 may be utilized to determine the threshold similarity to be applied.

In examples where the similarity metric does not satisfy the threshold similarity, the process 300 may end at block 314. In this example, the identification component may have determined that while some similarities are present as between the user identifiers at issue, those similarities are not sufficient to merit generation of a centralized identity. An example of this may be when the user identifiers include the same name or the same address, but other identifying information does not indicate a similarity. In this example, the user identifiers may be for different users with the same name, or two different users that live at the same address. In these and similar examples, a centralized identity may not be created. In this example, when a user requests to interact with a given application, the system may query a list of centralized identities to determine if the user is associated with a centralized identity. Here, since no centralized identity exists for the user in question, the centralized identity is not utilized to query user-related data and personalizations to the application are not made.

In examples where the similarity metric satisfies the threshold similarity, the process 300 may include, at block 316, generating the centralized identity. Generation of the centralized identity may include generating a new user identifier that is stored in association with the payment service and that associates the user identifiers from the various resources with the centralized identity. The payment service may store an indication of which resources the centralized identity is associated with and, in examples, data types that may be available from each of the resources.

At block 318, in one example, the process 300 may include generating an association between the centralized identity and data from the first resource that is associated with the first user identifier. In this example, the payment service may act as a data filtering component where the centralized identity is utilized to determine what user identifier for a given resource should be used to query that resource for data. Tagging data may be generated that tags data from the first resource that is associated with the first user identifier, and that tagging data may be associated with the centralized identity, such that when the centralized identity is used to return data from the first resource, the payment service may be able to filter the vast amount of data stored by the first resource to receive just the user-related data for the centralized identity. For example, the resource may include a mapping of a given centralized identity to portions of user-related data stored at the resource. As such, the payment service may provide a request for user-related data associated with the given centralized identity and the resource may utilize the centralized identity and the mapping to determine which portions of the stored user-related data are associated with the centralized identity. The payment service may then receive just the user-related data associated with the centralized identity from the resource in question.

At block 320, the process 300 may include generating an association between the centralized identity and data from the second resource that is associated with the second user identifier. Generating the association between the centralized identity and the data from the second resource may be performed in the same or a similar manner as described with respect to block 318, except that the association is with data from the second resource instead of data from the first resource.

Returning to block 316, at block 322, the process 300 may, in one example, include storing an instance of data from the first resource that is related to the first user identifier and data from the second resource that is related to the second user identifier in a database associated with the payment service. This operation may differ from the processes described with respect to blocks 318 and 320 at least because this operation may include storing an instance of the user-related data from the various resources in a datastore associated with the payment service, as opposed to querying databases of the resources when the user-related data is needed.

Figure 4:
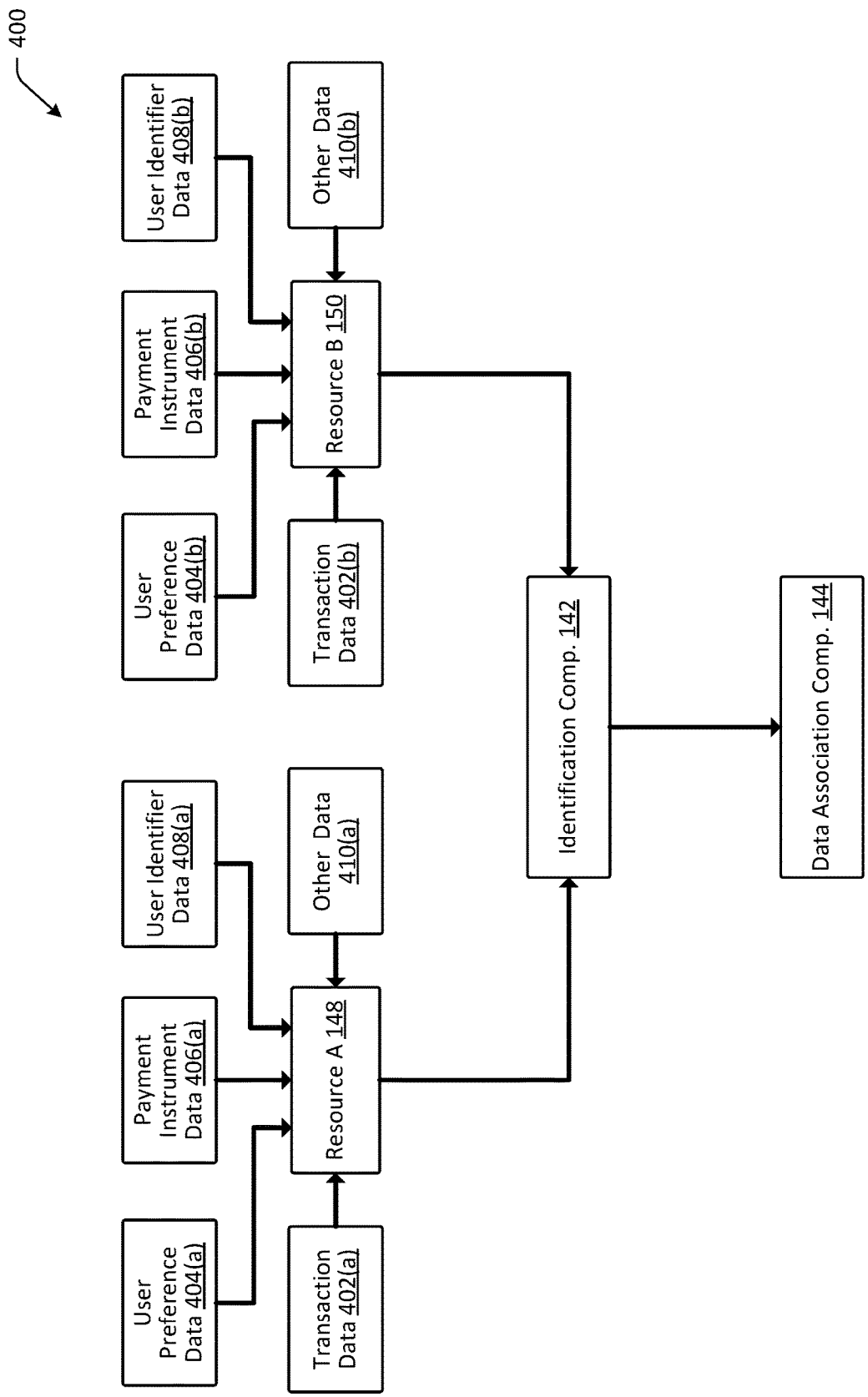
FIG. 4 is a conceptual diagram of example data and components utilized to determine user identifiers to associate with a centralized identity, according to an embodiment described herein.

FIG. 4 is a conceptual diagram of example data and components utilized to determine user identifiers to associate with a centralized identity, according to an embodiment described herein. FIG. 4 may include some of the same or similar components as described with respect to FIG. 1. For example, FIG. 4 may include multiple resources such as Resource A 148 and Resource B 150, an identification component 142, and a data association component 144. Additionally, FIG. 4 may include differing types of user-related data for each of the resources.

For example, as to Resource A 148, the resource may have access to one or more types of user-related data, such as transaction data 402(a), user preference data 404(a), payment instrument data 406(a), user identifier data 408(a), and other data 410(a). Likewise, as to Resource B 150, the resource may have access to one or more of the types of user-related data, such as transaction data 402(b), user preference data 404(b), payment instrument data 406(b), user identifier data 408(b), and other data 410(b). It should be understood that the types of data available to a given resource may not necessarily be available to another resource. Additionally, while only two resources are shown in FIG. 4, it should be understood that more than two resources may be utilized.

Examples of the transaction data 402(a), 402(b) may include prior transactions and details thereof that are associated with the given resource. Examples of the user preference data 404(a), 404(b) may include user preferences as set by a user of a given resource. Examples of the payment instrument data 406(a), 406(b) may include payment instruments utilized by the user across the various resources. Examples of the user identifier data 408(a), 408(b) may include any information that identifies a user, including username, contact information, billing information, location information, etc. The other data may be any other data stored in association with a given resource, and may include, for example, rewards data, inventory data, merchant information, etc.

The identification component 142 may be configured to query the resources for identification data associated with user identifiers stored by the resources. Each of these resources may be associated with various devices, systems, and databases that may store data associated with various user identifiers. In some examples, the payment service itself may be a resource. The identification data may be returned to the identification component 142, which may determine whether similarities in the identification data are present across datasets for the various resources. The identification component 142 may be configured to utilize this identification data to generate a similarity metric that indicates how similar identification data from a given resource is with respect to identification data from another resource. When the similarity metric satisfies a threshold similarity, the identification component 142 may determine that user identifiers associated with the multiple resources correspond to the same user. Thereafter, the identification component 142 may be configured to generate a centralized identity that maps to the user identifiers of the various resources. The centralized identity may be generated and stored in association with the payment service. The centralized identity may indicate a mapping between the centralized identity and the various user identifiers.

The data association component 144 may be configured to receive an indication of the generation of the centralized identity and may be configured perform operations to associate the centralized identity with data from the various resources that is associated with the individual user identifiers. In an example, associating the centralized identity with the user-related data from the individual resources may include flagging a portion of the data stored in association with the user's user identifier in a given resource as data that is associated with the centralized identity. Using the example above, a portion of the data stored by Resource A 148 that is associated with the first user identifier may be flagged as corresponding to the centralized identity, and a portion of the data stored by Resource B 150 that is associated with the second user identifier may be flagged as corresponding to the centralized identity. This data association technique may allow the payment service to query the various resources for user-related data by utilizing the centralized identity as the searching implement. In this example, an instance of the queried data may be returned to the payment service, which may aggregate the data from the various resources, format the data such that it is cohesive and thus can be utilized, and then utilize the user-related data for one or more purposes, including the personalization of data presentation to the user.

In another example, the data association component 144 may be configured to request an instance of the user-related data from the various resources and may aggregate and store that user-related data in association with the centralized identity. In this example, the payment service may act as a user-related data storage mechanism and may not necessarily need to query the resources at issue when an action associated with the user is to be performed. Instead, the centralized identity may be utilized to query the payment service database for the aggregated user-related data, which may be utilized as described herein.

Figure 5:
FIG. 5 is a flow diagram of an example process for associating various data sources across resources with a centralized identity, according to an embodiment described herein.

FIG. 5 includes example processes for personalization of data presentation utilizing a centralized identity. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4 and 6-14, although the processes may be implemented in a wide variety of other environments, architectures and systems.

FIG. 5 is a flow diagram of an example process 500 for associating various data sources across resources with a centralized identity, according to an embodiment described herein. The order in which the operations or steps are described is not intended to be construed as a limitation, and any number of the described operations may be combined in any order and/or in parallel to implement process 500. The process 500 may be performed utilizing the payment service 104, and specifically utilizing, for example, the data association component 144.

At block 502, the process 500 may include determining resources associated with a centralized identity. For example, a centralized identity may be generated as described in more detail with respect to FIG. 3, above. The centralized identity may be utilized to determine which of multiple potential resources the centralized identity is associated with. In the example of FIG. 5, a payment service may determine that the centralized identity is associated with two resources, each storing data that is tagged as being associated with the centralized identity.

At block 504, the process 500 may include querying resources for user-related data associated with the centralized identity. Querying the resources may cause the resources to determine a user identifier as maintained by a given resource that is associated with the centralized identity. The user identifier may then be utilized by the resource to determine what user-related data is associated with that user identifier, and that user-related data may be provided to the payment service. In other examples where the payment service stores an instance of the user-related data associated with a given centralized identity, the payment service may query a datastore that includes this user-related data.

At block 506, the process 500 may include determining whether there is user-related data that is similar across the resources. For example, once two use profiles from respective resources are determined to correspond to the same user, user-related data such as transaction data, user preference data, payment instrument data, user identifier data, and other data as detailed in FIG. 4 may be compared as between multiple resources to determine what, if any, of the data is similar. An example of this comparison may include determining that contact information is the same across the multiple resources, purchased items are similar, payment instrument use is similar, etc. In examples, machine learning may be utilized to determine whether user-related data from a first resource corresponds at least to a threshold degree to user-related data from a second resource, as described in more detail with respect to FIG. 9.

In examples where the user-related data is similar across the resources, the process 500 may include, at block 508, utilizing the similar data to determine personalizations to apply to one or more user interfaces. For example, an application modification component may identify the similar user-related data and may determine one or more personalizations based on that similar data. In one example, the similar data may include the purchase of specific items, the use or availability of specific incentives, the use of specific user preferences, etc. In these examples, the application modification component may determine that an application being utilized by the user should be modified to display items in an order based on the user-related data. In other examples, an item that is offered for sale that was purchased across multiple resources by the user, or that was recommended across multiple resources, or that is associated with incentives across multiple resources, or that is associated with a given user preference across resources may be a strong signal that such an item should be highlighted or otherwise ranked more favorably when presented to a user.

In another example, the presence of incentives across multiple resources may be aggregated by the application modification component such that the incentives may be displayed together in the same user interface. In another example, scheduling data across multiple resources may be aggregated and displayed in the same user interface, and that user interface may be modified to display targeted availability options for a given service in light of the scheduling data. In yet another example, transaction data across multiple resources may indicate that the user purchases items having certain characteristics in association with those multiple resources, and the application at issue may be modified to display those item details. In another example, the user-related data may indicate multiple payment methods available to the user across the multiple resources, and these payment methods may be aggregated such that the application at issue is caused to display all of these options in a given user interface. Additional personalizations may include the auto-population of information in a given application, the generation of affiliate links for user selection, and the availability of single use payment instruments. In examples, machine learning models may be utilized to determine what personalizations to apply based at least in part on prior personalizations that were applied, feedback data associated with the prior personalizations, or characteristics of the user profile at issue.

In examples where the user-related data is not similar across the resources, the process 500 may include, at block 510, determining a first set of personalizations associated with data from the first resource. This process may be performed in a similar manner to how determining personalizations is described with respect to block 508, except that the data from a single resource is utilized to determine the personalizations.

At block 512, the process 500 may include determining a second set of personalizations associated with data from the second resource. This process may be performed in the same or a similar manner as described with respect to block 510, except that data from the second resource instead of data from the first resource may be utilized to determine the set of personalizations.

At block 514, the process 500 may include arbitrating between the first set and second set of personalizations to determine whether any of the personalizations are conflicting. When the personalizations do not conflict, the personalizations may be aggregated and utilized to modify the application being used by the user. However, in examples where a personalization of a given set of personalizations conflicts with another personalization in another set of personalizations, the application modification component may arbitrate between the personalizations to determine which personalizations to apply (or whether to not apply a given personalization). For example, when determining the personalizations, one or more confidence values may be generated indicating a confidence for applying a given personalization. These confidence values may be utilized during the arbitration process to determine which personalizations to apply. Additionally, in examples, user preferences, outcomes of machine learning models, and user feedback may be utilized to arbitrate between personalizations to be applied.

At block 516, the process 500 may include modifying one or more instances of one or more applications utilizing selected personalizations from block 514 or block 508. Modifying instances of the applications may include sending commands or data to the applications that cause user interfaces of the applications to be modified such that information that would not have been displayed absent the personalizations is now displayed. The modifications may also include the sending of data and a request for the modification to the application at issue, and the application may perform the operations to actually modify the user interfaces.

Figure 6:
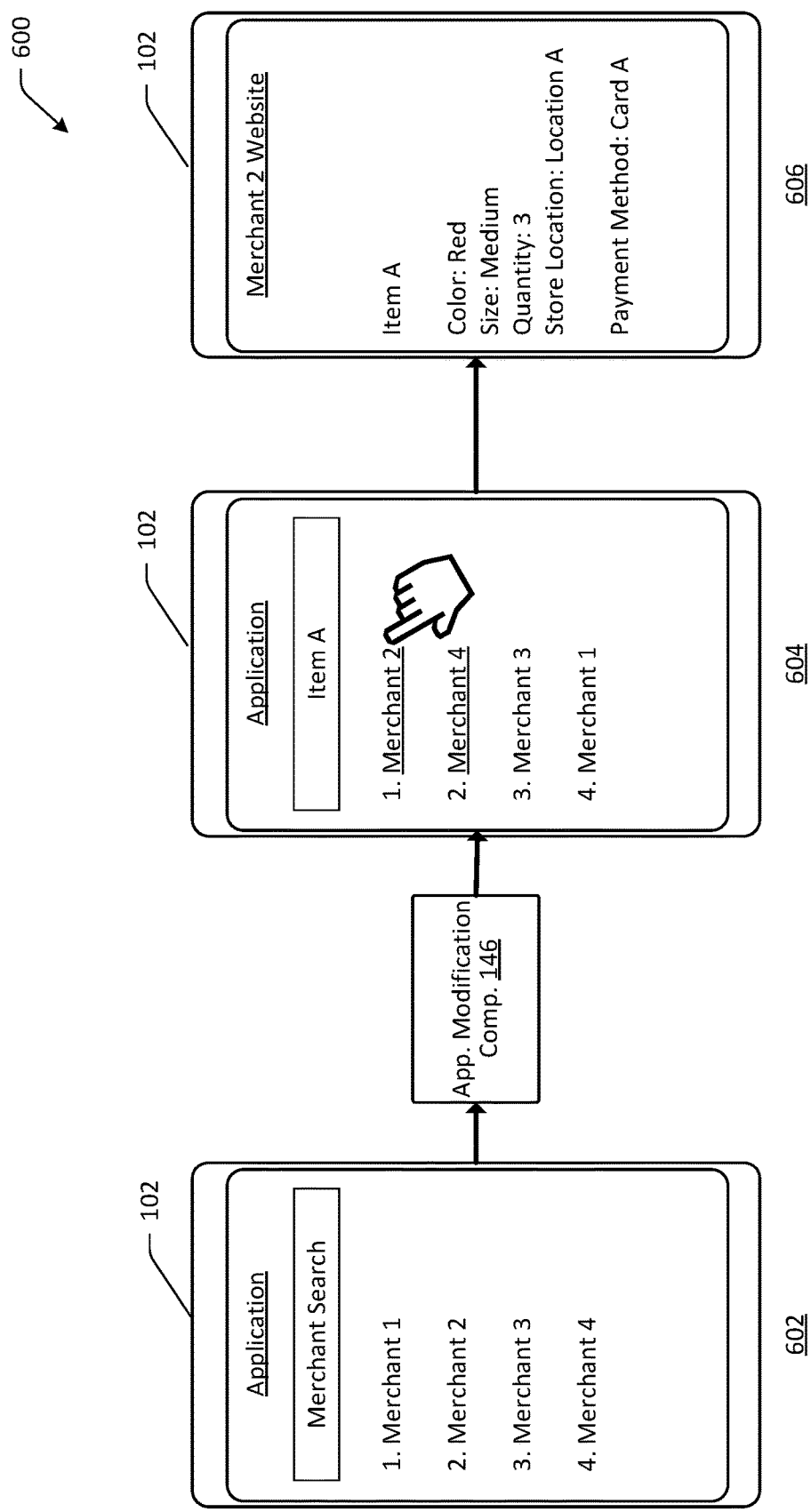
FIG. 6 is an example user interface displayed on an example user device, where the user interface is configured to present application modifications based on user-related data from a centralized identity, according to an embodiment described herein.

FIG. 6 is an example user interface 600 displayed on an example user device, where the user interface is configured to present application modifications based on user-related data from a centralized identity, according to an embodiment described herein. FIG. 6 may include some of the same components as described with respect to FIG. 1, including a user device 102 and an application modification component 146. The user interfaces 600 displayed in FIG. 6 are shown in three steps, steps 602 through 606.

At step 602, the user interface 600 may be configured to display a ranked list of merchants based on, for example, keyword search terms provided by a user. The keyword search terms may be merchant identifiers, item identifiers, or any other aspect associated with merchants. Similarity of the search terms to the merchants associated with a payment application or a payment service may be determined and utilized to display merchant indicators in a relevancy order. As shown in FIG. 6, the relevancy order may be Merchant 1, then Merchant 2, then Merchant 3, then Merchant 4.

However, one or more personalizations may be applied as described herein. To do so, the application modification component 146 may be configured to query for user-related data utilizing a centralized identity as described herein. One of those personalizations may include the use of affiliate links in a user interface. In the example of FIG. 6, at step 604, merchants that have enabled affiliate links with the payment service or payment application may be presented as selectable interactive elements. As shown in FIG. 6. Merchant 2 and Merchant 4 have been identified as being associated with affiliate links, while Merchant 1 and Merchant 3 are not associated with affiliate links. Based on which merchants are associated with affiliate links, the order of presented merchants may be modified dynamically. In the example of FIG. 6. Merchant 2 and Merchant 4 may be presented first based at least in part on those merchants being associated with affiliate links. The ordering may also be based at least in part on the incentives of the merchants that are associated with the affiliate links, with more advantageous incentives being prioritized our less advantageous incentives. Merchants 1 and 3 may be ranked lower than the other merchants based at least in part on Merchants 2 and 4 being associated with affiliate links.

Additionally, at step 606, when a user selects one of the affiliate links, the user-related data may be utilized to personalize the user interface of the merchant application that is associated with the affiliate link. In some examples, the affiliate links can be associated with individual user interface elements representative of discounts or incentives, search results, user profiles, or the like, wherein interaction with such a user interface element can cause an application or website associated with the merchant in question to be displayed in a foreground of the user device and cause the payment application to resolve to a background of the user device. In some examples, interaction with an affiliate link can cause a website of the associated merchant to be presented within the application itself (e.g., in a web container). In such examples, the user need not leave the application to access the merchant website. Generally, affiliate links allow a user to transition between applications or websites hosted by different entities and are traceable such that the originating application or resource can receive a fee (e.g., purchase attribution) for driving the user to the applications or websites hosted by different entities. In some examples, using the personalizations described herein, selection of an affiliate link may cause the affiliated application to launch and may cause the specific incentive at issue to automatically be applied for a transaction conducted in that affiliated application. In some examples, selection of the affiliate link may cause one or more of the other personalizations to occur with respect to the affiliated application such that the affiliated application is modified to present those personalizations. That is, in some examples, because the user accessed the merchant application or website from the payment application, personalization data associated with the user can be accessible to the merchant application or website. Accordingly, payment instrument data, shipping data, user preferences, and/or the like can be used for personalizing the user experience in the merchant application or website.

As described above, in some examples, the use of an affiliate link that results in a transaction can enable the payment service to receive fees that they otherwise may not receive in transactions that originate in the merchant application, on the merchant website, or otherwise outside of the payment application. In some examples, the user can use a particular payment method in which the payment service can avoid one or more fees, for example, if the user uses a stored balance (instead of a payment instrument such as a payment card). In some examples, if the user uses a payment instrument provided by the payment service to complete the transaction from the affiliate link, the payment service can receive additional or alternative fees, such as interchange fees. In such examples, the payment service can then recover an affiliate linking fee, or portion thereof, and interchange fees off of a single transaction. In some examples, if a user does not have a payment instrument provided by the payment service, the payment service can generate a single use payment instrument, as described herein, for use in the transaction. The single use payment instrument can be linked to an account of the user and generated in real-time ("on-the-fly"). The use of the single use payment instrument can enable the payment service to receive additional or alternative fees, such as interchange fees, as a result of the user using the single use payment instrument. In such examples, the payment service can then recover an affiliate linking fee, or portion thereof, and interchange fees off of a single transaction.

As shown in FIG. 6, options for the item at issue (here "Item 1") may be auto-populated in the merchant website, such as details about item color, size, quantity, store location, payment method, shipping address, etc.

Figure 7:
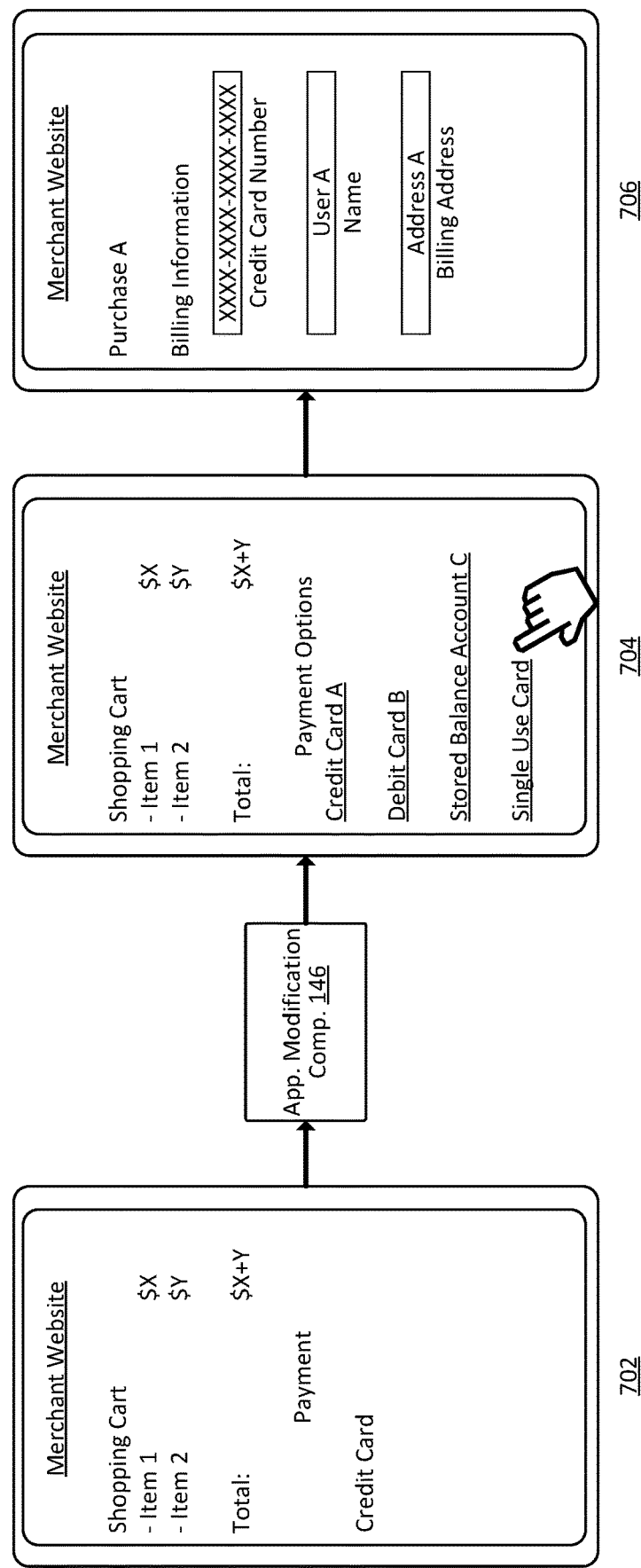
FIG. 7 is an example user interface displayed on an example user device, where the user interface is configured to present personalizations associated with single use payment instrument utilization, according to an embodiment described herein.

FIG. 7 is an example user interface displayed on an example user device, where the user interface is configured to present personalizations associated with single use payment instrument utilization, according to an embodiment described herein. FIG. 7 may include some of the same components as described with respect to FIG. 1, including a user device 102 and an application modification component 146. The user interfaces 700 displayed in FIG. 7 are shown in three steps, steps 702 through 706.

At step 702, the user interface 700 may be configured to display a transaction summary, which may include identifiers of items in a given transaction, prices of items, a total price for the transaction, and a payment input portion. Generally, the payment input portion is generic and not user specific, providing a user with generic options to input credit card information, utilize a banking routing number, making a gift card purchase, etc.

However, one or more personalizations may be applied as described herein. To do so, the application modification component 146 may be configured to query for user-related data utilizing a centralized identity as described herein. One of those personalizations may include the use of payment options that are specific to the user at issue. In FIG. 7, at step 704, the payment options include Credit Card A that is specific to the user, Debit Card B that is specific to the user, use of a stored balance account associated with the user, or use of a single use card authorized for use by the user. These payment options may be determined utilizing the user-related data across the multiple resources, such that payment methods used across those resources are aggregated and displayed in the user interface.

Additionally, at step 706, when a user selects one of the payment options (specifically the single use card option), a payment service may be configured to provide a single use payment instrument to the merchant website to satisfy a cost of the transaction at issue. Thereafter, if the information is attempted to be utilized again, one or more conditions determined by the payment service may fail. Those conditions may be whether the card has already been used, whether the timing of the request is outside a threshold amount of time from when the single use card was requested originally, whether the merchant is the correct merchant, whether the user device is the correct device, etc. In the example of FIG. 7, the information for the single user payment instrument may be auto-populated into the user interface 700 at step 706. In this example, the user needed to only select the single user payment option at step 704 and the transaction may be completed utilizing the user interface personalizations as described herein.

Figure 8:
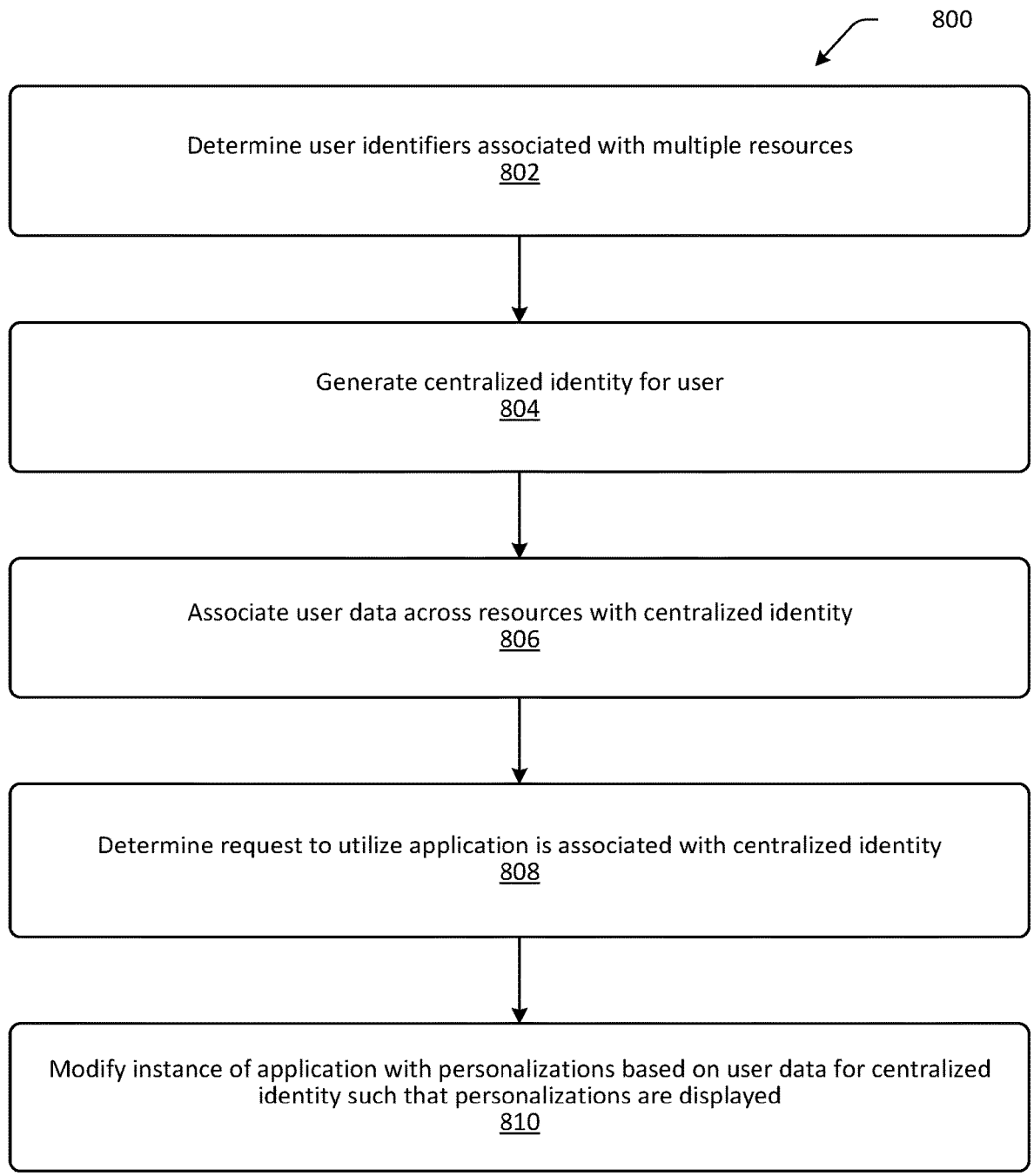
FIG. 8 is a flow diagram of an example process for personalization of data presentation, according to an embodiment described herein.
Figure 9:
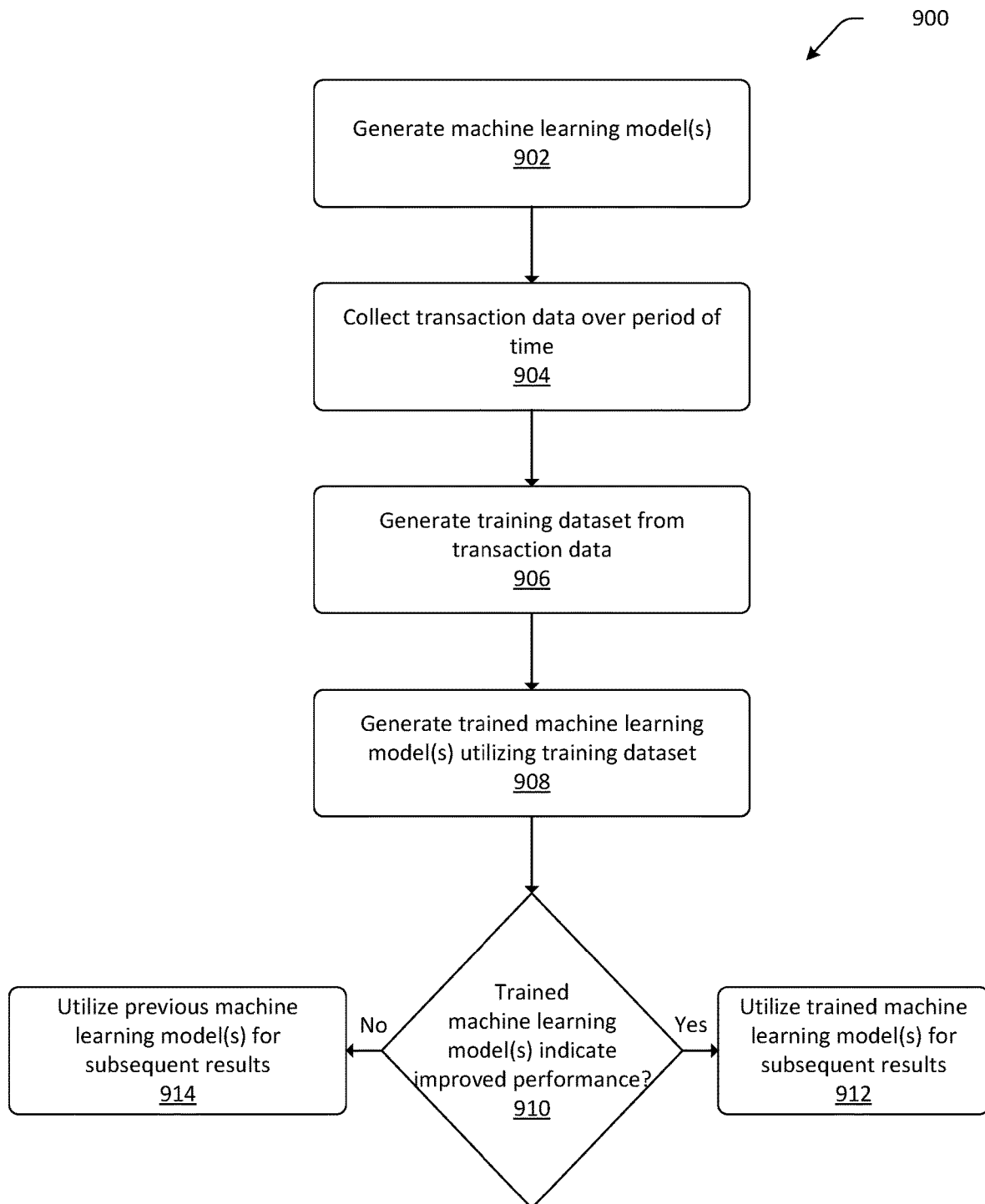
FIG. 9 is a flow diagram of an example process for the generation and training of machine learning models to perform one or more of the processes described herein, according to an embodiment described herein.

FIGS. 8 and 9 include example processes for personalization of data presentation utilizing a centralized identity. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 10-14, although the processes may be implemented in a wide variety of other environments, architectures and systems.

FIG. 8 is a flow diagram of an example process 800 for personalization of data presentation, according to an embodiment described herein. The order in which the operations or steps are described is not intended to be construed as a limitation, and any number of the described operations may be combined in any order and/or in parallel to implement process 800. The process 800 may be performed by, for example, the payment service 104 described with respect to FIG. 1.

At block 802, the process 800 may include determining user identifiers associated with multiple resources. For example, a first resource may include hundreds if not thousands of user identifiers associated with users that have utilized functionality associated with the first resource. An identification component of a payment service may query the resource of the user identifiers such that those user identifiers may be compared with user identifiers from other resources to determine similarities. The resource may store the user identifiers in a list, or as a data object that is searchable by the payment service, such as via one or more APIs. Additionally, the process 800 may include identifying a second user identifier from a second resource. Identifying the second user identifier may be performed in the same or a similar manner as identifying the first user identifier, except that the second resource may be queried instead of the first resource. It should be understood that while the process includes an example where two resources are queried for user identifiers, the process may include querying more than two resources for user identifiers.

At block 804, the process 800 may include generating a centralized identity for the user. Generation of the centralized identity may include generating a new user identifier that is stored in association with the payment service and that associates the user identifiers from the various resources with the centralized identity. The payment service may store an indication of which resources the centralized identity is associated with and, in examples, data types that may be available from each of the resources.

At block 806, the process 800 may include associating user data across resources with the centralized identity. For example, the payment service may act as a data filtering component where the centralized identity is utilized to determine what user identifier for a given resource should be used to query that resource for data. Tagging data may be generated that tags data from the first resource that is associated with the first user identifier, and that tagging data may be associated with the centralized identity, such that when the centralized identity is called to return data from the first resource, the payment service may be able to filter the vast amount of data stored by the first resource to receive just the user-related data for the centralized identity. The same operations may be performed with respect to one or more other resources associated with the centralized identity. In a different example, the process may include storing an instance of data from the first resource that is related to the first user identifier and data from the second resource that is related to the second user identifier in a database associated with the payment service.

At block 808, the process 800 may include determining that a request to utilize an application is associated with the centralized identity. For example, a user may provide user input to a payment application such as the payment application described with respect to FIG. 1, or a user may provide user input to a merchant application, or in the case of a merchant the merchant may utilize a point of sale system, an inventory management system, a reward system, or any other application associated with the merchant in question. When interacting with the payment application, the user may be logged in using a given user profile that is mapped to the centralized identity. In other examples, a user device identifier, application identifier, or other user login information may be utilized to determine which centralized identity is in question. As described above, the centralized identity is mapped to individual user profiles as maintained by various resources, applications, and within the payment service. As such, once the user profile at issue is known, that user profile may be utilized to determine the centralized identity at issue.

At block 810, the process 800 may include modifying an instance of the application with personalizations based on the user data for the centralized identity such that the personalizations are displayed. Modifying instances of the applications may include sending commands or data to the applications that cause user interfaces of the applications to be modified such that information that would not have been displayed absent the personalizations is now displayed. The modifications may also include the sending of data and a request for the modification to the application at issue, and the application may perform the operations to actually modify the user interfaces.

Additionally, or alternatively, the process 800 may include the first resource being a service of a payment system, wherein a payment application of the payment system is associated with the first user identifier. The process 800 may also include the second resource being an ecommerce website of the merchant, wherein the ecommerce website stores the second user identifier in association with purchases made on the ecommerce website.

Additionally, or alternatively, the process 800 may include generating a first association between the first user identifier and the centralized identity such that the first data is associated with the centralized identity. The process 800 may also include generating a second association between the second user identifier and the centralized identity such that the second data is associated with the centralized identity.

Additionally, or alternatively, the process 800 may include the user-related data being at least one of transaction data indicating transactions associated with the first resource and the second resource, user preference data indicating user preferences associated with the first resource and the second resource, payment instrument data indicating one or more payment instrument identifiers stored in association with the first resource and the second resource, or user identifier data indicating one or more user identifiers as stored in association with the first resource and the second resource.

Additionally, or alternatively, the process 800 may include receiving additional user input data requesting access to the application. The process 800 may also include determining that the centralized identity is not associated with the additional user input data. The process 800 may also include causing, based at least in part on the centralized identity not being associated with the additional user input data, the application to be displayed without the one or more personalizations applied. In this example, when the application at issue is utilized the payment service may determine that the user profile utilized to use the application is not associated with an centralized identity and thus personalizations that may be employed as described herein may not be utilized. In other examples, use of the application may not be associated with a user profile at all, such as when a user has not provided login information but functionality of the application is still available. In these examples, the centralized identity may not be determined and thus the personalizations may not be utilized.

Additionally, or alternatively, the process 800 may include determining, from the user-related data, that the user has purchased previous items having an item characteristic in association with the first resource and the second resource. In these examples, the one or more personalizations may include configuring items offered by the merchant to emphasize a portion of the items that are associated with the item characteristic.

Additionally, or alternatively, the process 800 may include determining, from the user-related data, that the user is associated with an incentive from at least one of the first resource or the second resource. In these examples, the one or more personalizations may include causing display of an indicator of the incentive with the instance of the application.

Additionally, or alternatively, the process 800 may include determining, from the user-related data, that the first resource indicates a first appointment associated with the user and the second resource indicates a second appointment associated with the user. In these examples, the one or more personalizations may include presenting the first appointment and the second appointment concurrently with the instance of the application.

Additionally, or alternatively, the process 800 may include determining, from the user-related data, user preferences of the user as provided by the first resource and the second resource. In these examples, the one or more personalizations may include presenting item details associated with items offered by the merchants, the item details determined from the user preferences.

Additionally, or alternatively, the process 800 may include determining, from the user-related data, prior transactions of the user made in association with the first resource and the second resource. In these examples, the one or more personalizations may include presenting item details associated with items offered by the merchants, the item details determined from the prior transactions.

Additionally, or alternatively, the process 800 may include determining, from the user-related data, first payment options of the user associated with the first resource and second payment options of the user associated with the second resource. In these examples, the one or more personalizations may include presenting the first payment options and the second payment options with the instance of the application.

Additionally, or alternatively, the process 800 may include determining, from the user-related data, user identifying information associated with the first resource and the second resource. In these examples, the one or more personalizations may include auto-populating the instance of the application with the user identifying information.

Additionally, or alternatively, the process 800 may include determining, from the user-related data, merchants that the user has interacted with prior to receiving the user input data. The process 800 may also include generating one or more interactive elements, wherein individual ones of the interactive elements corresponds to a given merchant of the merchants and is configured to cause the instance of the application to be presented in a foreground of a user device from which the user input data is received.

Additionally, or alternatively, the process 800 may include determining, from the user-related data, that the user has utilized a previous single use payment instrument in association with the first resource and the second resource. In this example, the one or more personalizations may include display of a single use payment option for purchasing an item from the merchant.

Additionally, or alternatively, the process 800 may include determining a similarity metric between identifying information from the first data and identifying information from the second data. The process 800 may also include determining that the similarity metric satisfies a threshold similarity score that indicates the first identifier and the second identifier are associated with a same user. In these examples, generating the centralized identity may be based at least in part on the similarity metric satisfying the threshold similarity score.

Additionally, or alternatively, the process 800 may include querying the first resource for the first data and querying the second resource for the second data. The process 800 may also include storing an instance of the first data and the second data as the user-related data in association with the centralized identity.

FIG. 9 is a flow diagram of an example process 900 for the generation and training of machine learning models to perform one or more of the processes described herein, according to an embodiment described herein. The order in which the operations or steps are described is not intended to be construed as a limitation, and any number of the described operations may be combined in any order and/or in parallel to implement process 900.

At block 902, the process 900 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering. Bayesian networks, reinforcement learning, representation learning, similarity and metric learning, sparse dictionary learning, and/or rules-based machine learning.

Information from stored and/or accessible data may be extracted from one or more databases, such as the datastore(s) 130, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 904, the process 900 may include collecting transaction data over a period of time. The transaction data may include any of the data described with respect to the datastore(s) 130, any data associated with any of the resources described herein, any data described with respect to FIGS. 1-7, or any other data that may be utilized to perform the operations described herein. In examples, the transaction data may include data from any of the resources described with respect to FIG. 1, including some or all data available to a given resource associated with merchant transactions, a resource associated with a rewards program, a resource associated with scheduling data, a resource associated with a payment application, a resource associated with an investment platform, a resource associated with a wish list, a messaging platform, gift cards, shopping, and so on. Other resources may include, for example, a loyalty program resource, a coupon resource, a promotions resource, an appointment scheduling resource, a feedback resource associated with customer feedback, an order-ahead resource associated with customers ordering items prior to when the items are available for purchase, an order tracking resource, a digital receipt resource, a purchase history resource, a user check-in resource associated with users providing input data for checking in to a service, an invoice resource, etc.

At block 906, the process 900 may include generating a training dataset from the transaction data. Generation of the training dataset may include formatting the transaction data into input vectors for the machine learning model to intake, as well as associating the various data with the outcomes of the transactions described herein. In addition, any feedback data associated with any of the processes described herein may be included in the training dataset. The feedback data may indicate an accuracy of prior associations of user-related data with a centralized identifier, an accuracy or desirability of user interface modifications, etc.

At block 908, the process 900 may include generating one or more trained machine learning models utilizing the training dataset. Generation of the trained machine learning models may include updating parameters and/or weightings and/or thresholds utilized by the models to determine user identification data similarities, to generate associations between centralized identities and resource-related identifiers, to determine one or more personalizations, etc. based at least in part on the data from the training dataset.

At block 910, the process 900 may include determining whether the trained machine learning models indicate improved performance metrics. For example, a testing group may be generated where the outcomes of the transactions are known but not to the trained machine learning models. The trained machine learning models may generate results, which may be compared to the known results to determine whether the results of the trained machine learning model produce a superior result than the results of the machine learning model prior to training.

In examples where the trained machine learning models indicate improved performance metrics, the process 900 may include, at block 912, utilizing the trained machine learning models for generating subsequent results. For example, the trained machine learning models may be utilized to generate interactive elements, to identify similarities in user identifiers, to determine personalizations, etc. Additionally, the trained machine learning models may be utilized to adjust or recommend adjusting user preferences or condition thresholds as described herein. It should be understood that the trained machine learning models may be utilized in any scenario where models are utilized as described herein. As described more fully herein, the trained machine learning models may be utilized to determine whether similar characteristics between user identifiers are present as described with respect to FIG. 3, to determine a similarity metric threshold as described with respect to FIG. 3, to determine if user-related data is similar across multiple resources as described with respect to FIG. 5, determining sets of personalizations from user-related data of a centralized identity as described with respect to FIG. 5, and to arbitrate between personalization sets as described with respect to FIG. 5, for example.

In examples where the trained machine learning models do not indicate improved performance metrics, the process 900 may include, at block 914, utilizing the previous iteration of the machine learning models for generating subsequent results. For example, instead of utilizing the trained machine learning model(s), the previously-generate machine learning models as described with respect to block 902 may be utilized. Thereafter, additional training datasets may be generated and utilized to generate subsequently trained machine learning models to determine if such models improve performance metrics.

Figure 10:
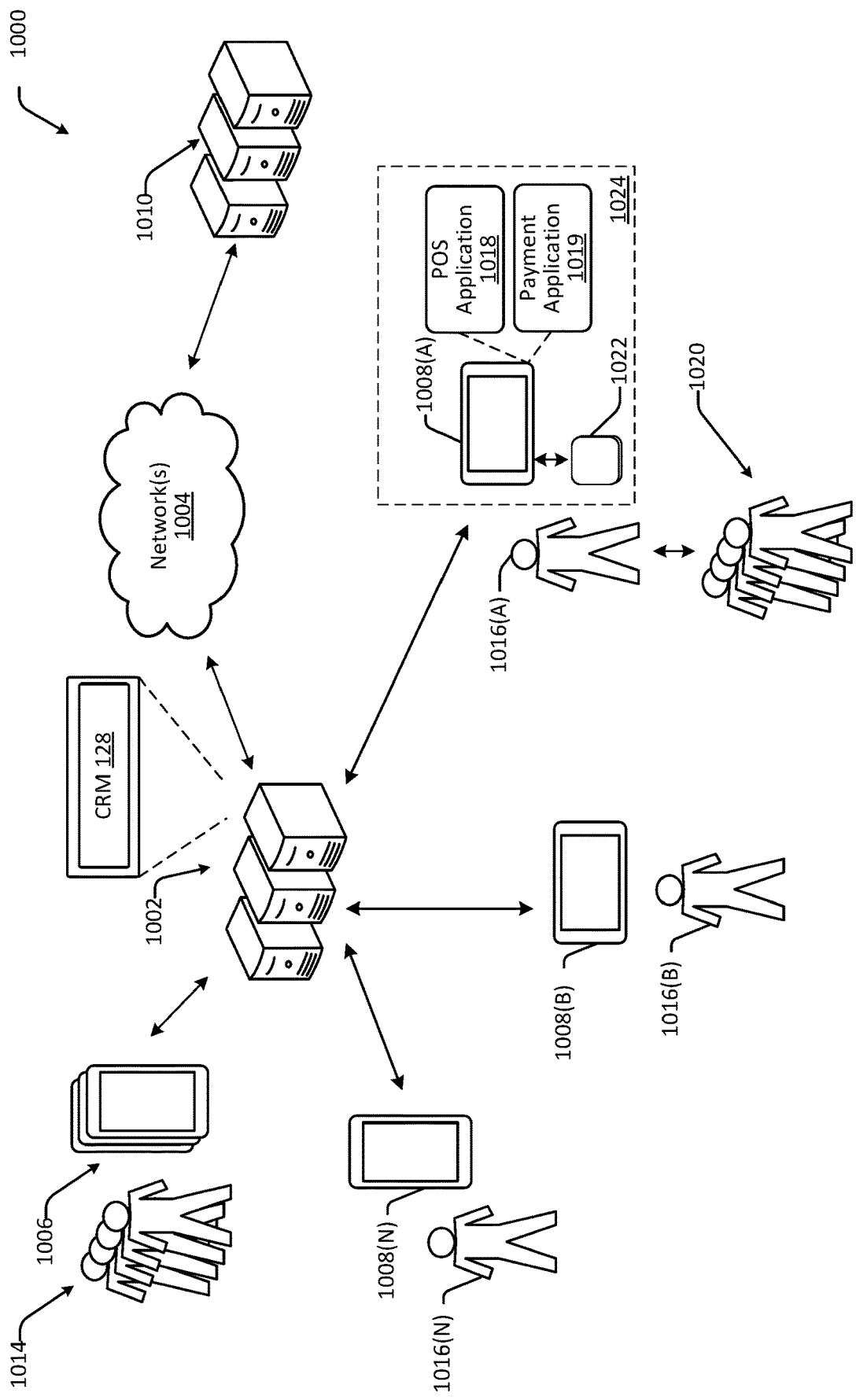
FIG. 10 is an example environment with user devices, merchant devices, a payment service, and/or other systems that may be involved in a transaction, such as by utilizing the payment application as configured herein, according to an embodiment described herein.

FIG. 10 is an example environment with user devices, merchant devices, a payment service, and/or other systems that may be involved in a transaction, such as by utilizing the payment application as configured herein, according to an embodiment described herein. The environment 1000 includes server(s) 1002 that can communicate over a network 1004 with user devices 1006 (which, in some examples can be merchant devices 1008 (individually. 1008(A)-1008(N))) and/or server(s) 1010 associated with third-party service provider(s). The server(s) 1002 can be associated with a service provider that can provide one or more services for the benefit of users 1014, as described below. Actions attributed to the service provider can be performed by the server(s) 1002.

In examples, the server(s) 1002 may be the same as or similar to the payment service 104 from FIG. 1, which may include the same or similar components as described with respect to the payment service 104 of FIG. 1, including the components of the CRM 128 as shown in FIG. 10. Further, the user devices 102 from FIG. 1 may have the same or similar components and perform the same or similar functionality as the user devices 1006 from FIG. 10.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

As described above, in at least one example, the users 1014 can include merchants 1016 (individually, 1016(A)-1016(N)). In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow; barter, etc.). The merchants 1016 can offer items for purchase or other means of acquisition via brick-and-mortar stores, mobile stores (e.g., pop-up shops, food trucks, etc.), online stores, combinations of the foregoing, and so forth. In some examples, at least some of the merchants 1016 can be associated with a same entity but can have different merchant locations and/or can have franchise/franchisee relationships. In additional or alternative examples, the merchants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1008 can have an instance of a POS application 1018 stored thereon. The POS application 1018 can configure the merchant device 1008 as a POS terminal, which enables the merchant 1016(A) to interact with one or more customers 1020. As described above, the users 1014 can include customers, such as the customers 1020 shown as interacting with the merchant 1016(A). For the purpose of this discussion, a "customer" can be any entity that acquires items from merchants. While only two customers 1020 are illustrated in FIG. 10, any number of customers 1020 can interact with the merchants 1016. Further, while FIG. 10 illustrates the customers 1020 interacting with the merchant 1016(A), the customers 1020 can interact with any of the merchants 1016.

In at least one example, interactions between the customers 1020 and the merchants 1016 that involve the exchange of funds (from the customers 1020) for items (from the merchants 1016) can be referred to as "transactions." In at least one example, the POS application 1018 can determine transaction data associated with the POS transactions. Transaction data can include payment information, which can be obtained from a reader device 1022 associated with the merchant device 1008(A), user authentication data, purchase amount information, point-of-purchase information (e.g., item(s) purchased, date of purchase, time of purchase, etc.), etc. The POS application 1018 can send transaction data to the server(s) 1002 such that the server(s) 1002 can track transactions of the customers 1020, merchants 1016, and/or any of the users 1014 over time. Furthermore, the POS application 1018 can present a UI to enable the merchant 1016(A) to interact with the POS application 1018 and/or the service provider via the POS application 1018.

In at least one example, the merchant device 1008(A) can be a special-purpose computing device configured as a POS terminal (via the execution of the POS application 1018). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, BLE, and so on. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1022, and communicate with the server(s) 1002, which can provide, among other services, a payment processing service. The server(s) 1002 associated with the service provider can communicate with server(s) 1010, as described below. In this manner, the POS terminal and reader device 1022 may collectively process transaction(s) between the merchants 1016 and customers 1020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices. POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to the customers 1020. In additional or alternative examples, the POS terminal can have a display integrated therein for presenting information to the customers 1020. POS systems, such as the POS system 1024, may be mobile, such that POS terminals and reader devices may process transactions in disparate locations across the world. POS systems can be used for processing card-present transactions and card-not-present (CNP) transactions, as described below:

A card-present transaction is a transaction where both a customer 1020 and his or her payment instrument are physically present at the time of the transaction. Card-present transactions may be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a customer 1020 slides a card, or other payment instrument, having a magnetic strip through a reader device 1022 that captures payment data contained in the magnetic strip. A dip is a card-present transaction where a customer 1020 inserts a payment instrument having an embedded microchip (i.e., chip) into a reader device 1022 first. The dipped payment instrument remains in the payment reader until the reader device 1022 prompts the customer 1020 to remove the card, or other payment instrument. While the payment instrument is in the reader device 1022, the microchip can create a one-time code which is sent from the POS system 1024 to the server(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1020 may tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange information with the reader device 1022. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1024, the server(s) 1002, and/or the server(s) 1010 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1010. As described above, in at least one example, the server(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1010 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1010 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1010 associated therewith), and a payment authorization message is communicated from the issuer to the POS device via a path opposite of that described above, or via an alternate path.

As described above, the server(s) 1010, which can be associated with payment service provider(s), may determine whether the transaction is authorized based on the transaction data, as well as information relating to parties to the transaction (e.g., the customer 1020 and/or the merchant 1016(A)). The server(s) 1010 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1010 to authorize or decline transactions.

Based on the authentication notification that is received by the POS system 1024 from server(s) 1002, the merchant 1016(A) may indicate to the customer 1020 whether the transaction has been approved. In some examples, approval may be indicated at the POS system 1024, for example, at a display of the POS system 1024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1014 can access all of the services of the service provider. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application, web browser, etc.).

The service provider can offer payment processing services for processing payments on behalf of the merchants 1016, as described above. For example, the service provider can provision payment processing software, payment processing hardware and/or payment processing services to merchants 1016, as described above, to enable the merchants 1016 to receive payments from the customers 1020 when conducting POS transactions with the customers 1020. For instance, the service provider can enable the merchants 1016 to receive cash payments, payment card payments, and/or electronic payments from customers 1020 for POS transactions and the service provider can process transactions on behalf of the merchants 1016.

As the service provider processes transactions on behalf of the merchants 1016, the service provider can maintain accounts or balances for the merchants 1016 in one or more ledgers. For example, the service provider can analyze transaction data received for a transaction to determine an amount of funds owed to a merchant 1016(A) for the transaction. In at least one example, such an amount can be a total purchase price less fees charged by the service provider for providing the payment processing services. Based on determining the amount of funds owed to the merchant 1016(A), the service provider can deposit funds into an account of the merchant 1016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1016(A) to a bank account of the merchant 1016(A) that is held at a bank or other financial institution (e.g., associated with the server(s) 1010). Scheduled deposits can occur at a prearranged time after a POS transaction is funded, which can be a business day after the POS transaction occurred, or sooner or later. In some examples, the merchant 1016(A) can access funds prior to a scheduled deposit. For instance, the merchant 1016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider to the bank account of the merchant 1016(A).

In at least one example, the service provider may provide inventory management services. That is, the service provider may provide inventory tracking and reporting. Inventory management services may enable the merchant 1016(A) to access and manage a database storing data associated with a quantity of each item that the merchant 1016(A) has available (i.e., an inventory). Furthermore, in at least one example, the service provider can provide catalog management services to enable the merchant 1016(A) to maintain a catalog, which can be a database storing data associated with items that the merchant 1016(A) has available for acquisition (i.e., catalog management services). In at least one example, the catalog may include a plurality of data items and a data item of the plurality of data items may represent an item that the merchant 1016(A) has available for acquisition. The service provider can offer recommendations related to pricing of the items, placement of items on the catalog, and multi-party fulfilment of the inventory.

In at least one example, the service provider can provide business banking services, which allow the merchant 1016(A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1012 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1014 who are unfamiliar with HTML. XML. JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider can recommend and/or generate content items to supplement omni-channel presences of the merchants 1016. That is, if a merchant of the merchants 1016 has a web page, the service provider-via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1014 to set schedules for scheduling appointments and/or users 1014 to schedule appointments.

In some examples, the service provider can provide restaurant management services to enable users 1014 to make and/or manage reservations, to monitor front-of-house and/or back-of-house operations, and so on. In such examples, the merchant device(s) 1008 and/or server(s) 1002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfillment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1006.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1014 may be new to the service provider such that the user 1014 that has not registered (e.g., subscribed to receive access to one or more services offered by the service provider) with the service provider. The service provider can offer onboarding services for registering a potential user 1014 with the service provider. In some examples, onboarding can involve presenting various questions, prompts, and the like to a potential user 1014 to obtain information that can be used to generate a profile for the potential user 1014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1014 providing all necessary information, the potential user 1014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1010). That is, the service provider can offer IDV services to verify the identity of users 1014 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1014 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1002) and/or the server(s) 1010 via the network(s) 1004. In some examples, the merchant device(s) 1008 are not capable of connecting with the service provider (e.g., the server(s) 1002) and/or the server(s) 1010, due to a network connectivity issue, for example. In additional or alternative examples, the server(s) 1002 are not capable of communicating with the server(s) 1010 due to network connectivity issue, for example. In such examples, devices may operate in "offline" mode where at least some payment data is stored (e.g., on the merchant device(s) 1008) and/or the server(s) 1002 until connectivity is restored and the payment data can be transmitted to the server(s) 1002 and/or the server(s) 1010 for processing.

In at least one example, the service provider can be associated with a hub, such as an order hub, an inventory hub, a fulfillment hub and so on, which can enable integration with one or more additional service providers (e.g., associated with the additional server(s) 1010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1006 that are in communication with one or more server computing devices 1002 of the service provider. That is, techniques described herein are directed to a specific implementation—or, a practical application—of utilizing a distributed system of user devices 1006 that are in communication with one or more server computing devices 1002 of the service provider to perform a variety of services, as described above. The unconventional configuration of the distributed system described herein enables the server(s) 1002 that are remotely-located from end-users (e.g., users 1014) to intelligently offer services based on aggregated data associated with the end-users, such as the users 1014 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006. Furthermore, such features are changed dynamically based on the profiles of the users involved interacting with the GUIs. As such, techniques described herein are directed to improvements to computing systems.

Figure 11:
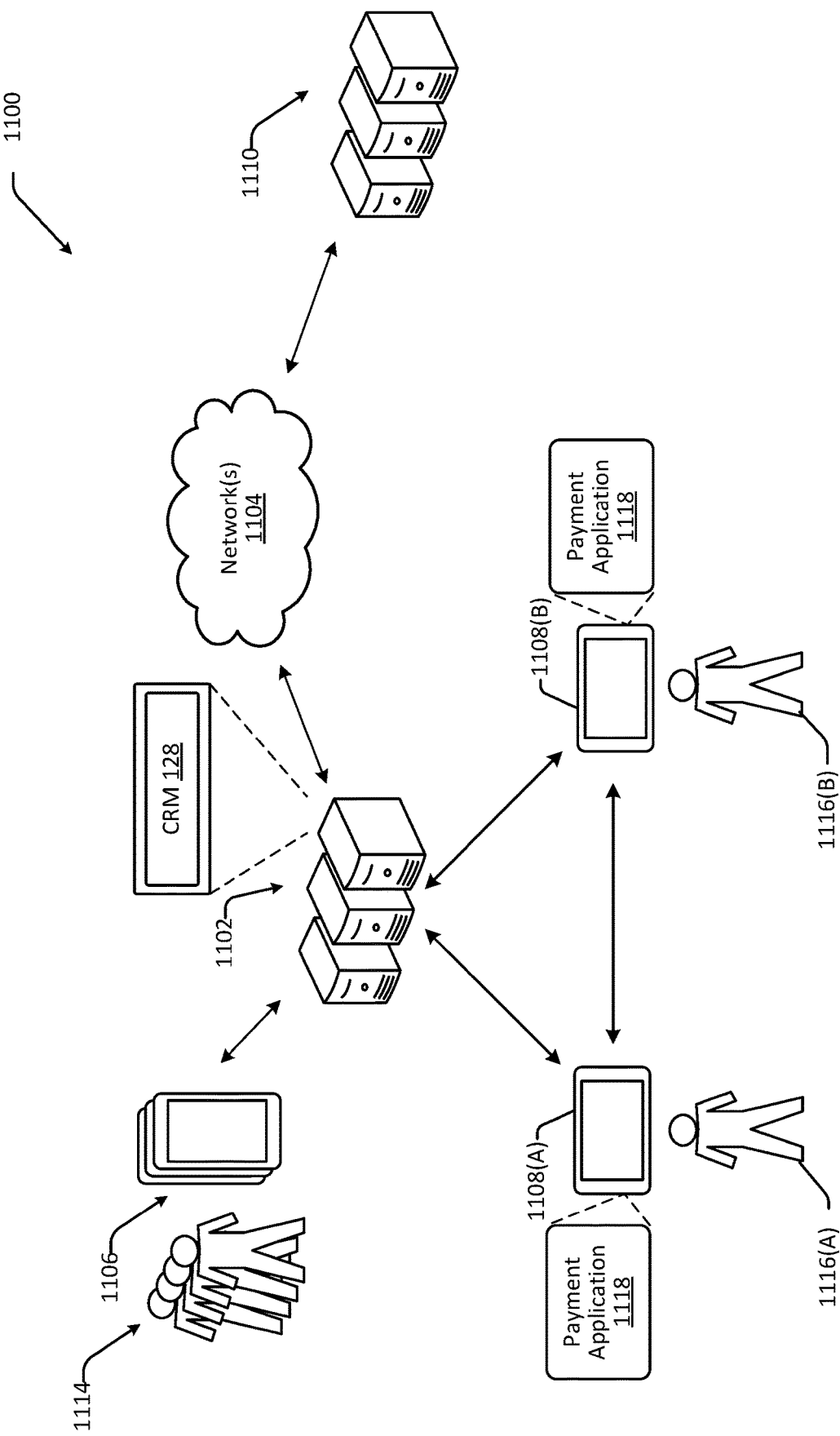
FIG. 11 is an example environment illustrating usage of the payment application, such as described herein, according to an embodiment described herein.

FIG. 11 is an example environment illustrating usage of the payment application, according to an embodiment described herein. The environment 1100 includes server(s) 1102 that can communicate over a network 1104 with user devices 1106 (which, in some examples can be user devices 1108 (individually, 1108(A), 1108(B)) and/or server(s) 1110 associated with third-party service provider(s). The server(s) 1102 can be associated with a service provider that can provide one or more services for the benefit of users 1114, as described below. Actions attributed to the service provider can be performed by the server(s) 1102. In some examples, the service provider referenced in FIG. 10 can be the same or different than the service provider referenced in FIG. 11.

As described herein, the server(s) 1102 may be the same or similar to the payment service 104 described with respect to FIG. 1, which may include the same or similar components as described with respect to the payment service 104 of FIG. 1, including the components of the CRM 128, as shown in FIG. 11. The user devices 1106, 1108 may be the same or similar to the user device 102 described with respect to FIG. 1. The server(s) 1110 associated with third-party service provider(s) may be the same as or similar to the systems associated with payment services or the like, as described herein.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. In some examples, individual ones of the user devices can be operable by users 1114. The users 1114 can be referred to as customers, buyers, merchants, sellers, borrowers, employees, employers, payors, payees, couriers and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

In at least one example, the service provider can provide a peer-to-peer payment service that enables peer-to-peer payments between two or more users 1114. Two users, user 1116(A) and user 1116(B) are illustrated in FIG. 11 as "peers" in a peer-to-peer payment. In at least one example, the service provider can communicate with instances of a payment application 1118 (or other access point) installed on devices 1106 configured for operation by users 1114. In an example, an instance of the payment application 1118 executing on a first device 1108(A) operated by a payor (e.g., user 1116(A)) can send a request to the service provider to transfer an asset (e.g., fiat currency, non-fiat currency, cryptocurrency, securities, gift cards, and/or related assets) from the payor to a payee (e.g., user 1116(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 12:
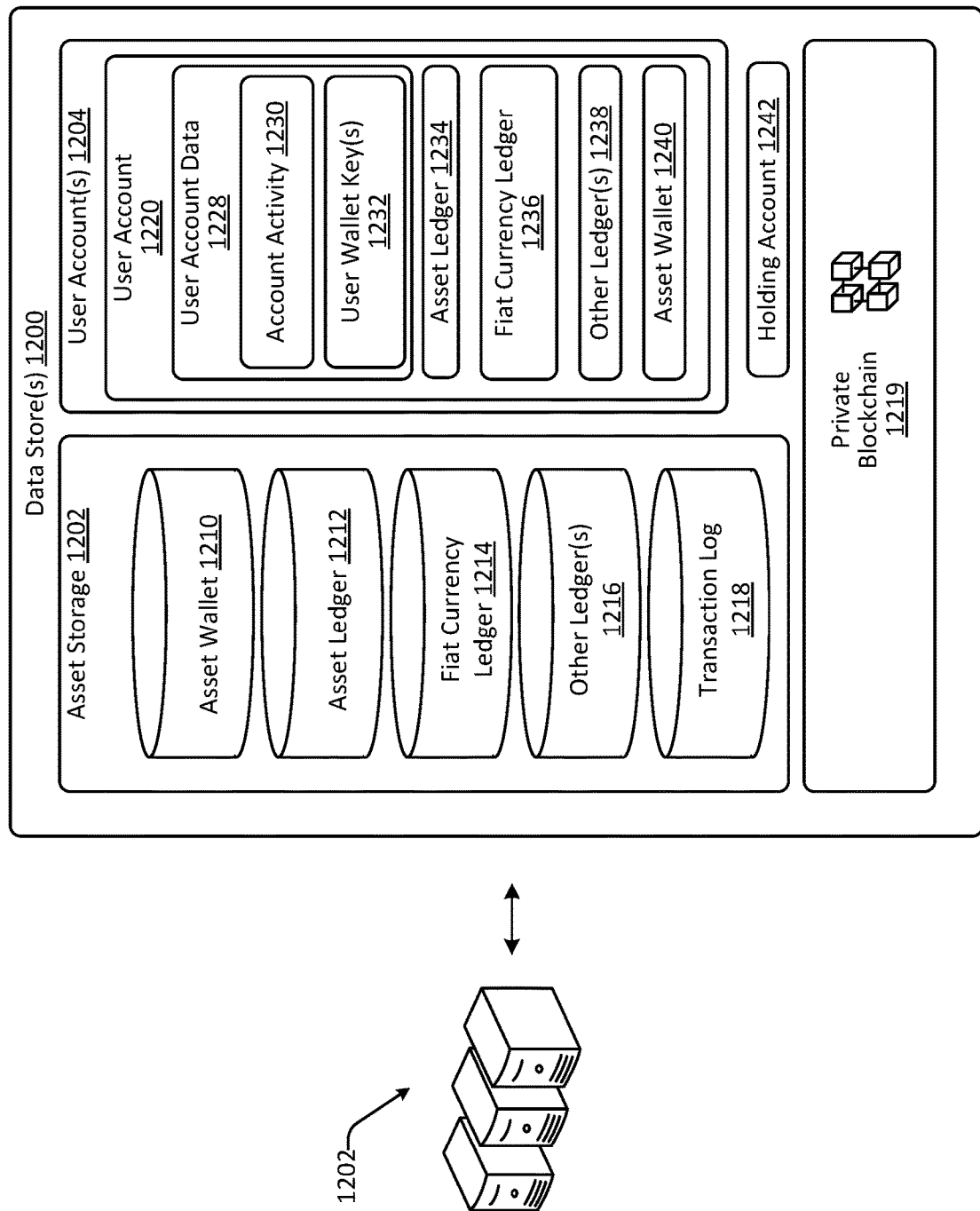
FIG. 12 is an example of datastore(s) that can be associated with servers of the payment service, according to an embodiment described herein.

In some examples, the service provider can utilize a ledger system to track transfers of assets between users 1106. FIG. 12, below, provides additional details associated with such a ledger system. The ledger system can enable users 1106 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1118 executing on user device(s) of payee(s). As an example, the service provider can transfer assets from an account of user 1116(A) to an account of the user 1116(B) and can send a notification to the user device 1108(B) of the user 1116(B) for presentation via a user interface. The notification can indicate that a transfer is in process, a transfer is complete, or the like. In some examples, the service provider can send additional or alternative information to the instances of the payment application 1118 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1102 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1118 executing on the user devices 1106. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 11. For instance, the service provider can offer messaging services that provide a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1106 (e.g., mobile device or conventional personal computer (PC)) based on instructions transmitted to and from the server(s) 1102 (which, in such an example, can be called a "messaging server"). In some instances, the messaging application can include a payment application with messaging capability that enables users of the payment application to communicate with one another. In such instances, the payment application can be executed on a user device 1106 based on instructions transmitted to and from the server(s) 1102 (e.g., the payment service discussed in this description or another payment service that supports payment transactions). In some examples, the messaging application can be provided by a third-party service provider associated with the server(s) 1110. In examples where the messaging application is a third-party service provider, the server(s) 1110 can be accessible via one or more APIs or other integrations.

As described above, the service provider can facilitate peer-to-peer transactions, which can enable users 1106 to transfer fiat currency, non-fiat currency, cryptocurrency, securities, or other assets, or portions thereof, to other users 1106. In at least one example, individual users can be associated with user accounts. Additional details associated with user accounts and the transfer of assets between users 1106 are described below with reference to FIG. 12.

Furthermore, the service provider of FIG. 11 can enable users 1106 to perform banking transactions via instances of the payment application 1118. For example, users can configure direct deposits or other deposits for adding assets to their various ledgers/balances. Further, users 1106 can configure bill pay, recurring payments, and/or the like using assets associated with their accounts. In addition to sending and/or receiving assets via peer-to-peer transactions, users 1106 buy and/or sell assets via asset networks such as cryptocurrency networks, securities networks, and/or the like.

FIG. 12 is an example of data store(s) that can be associated with servers of the payment service, according to an embodiment described herein. In at least one example, the data store(s) 1200 can store assets in an asset storage 1202, as well as data in user account(s) 1204, merchant account(s) 1206, and/or customer account(s) 1208. In at least one example, the asset storage 1202 can be used to store assets managed by the service provider of FIG. 11. In at least one example, the asset storage 1202 can be used to record whether individual of the assets are registered to users. For example, the asset storage 1202 can include an asset wallet 1210 for storing records of assets owned by the service provider of FIG. 11, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1110 can be associated therewith. In some examples, the asset wallet 1210 can communication with the asset network via one or more components associated with the server(s) 1102.

The asset wallet 1210 can be associated with one or more addresses and can vary addresses used to acquire assets (e.g., from the asset network(s)) so that its holdings are represented under a variety of addresses on the asset network. In examples where the service provider of FIG. 11 has its own holdings of cryptocurrency (e.g., in the asset wallet 1210), a user can acquire cryptocurrency directly from the service provider of FIG. 11. In some examples, the service provider of FIG. 11 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of the asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1202 may contain ledgers that store records of assignments of assets to users 1106. Specifically, the asset storage 1202 may include asset ledger 1210, fiat currency ledger 1214, and other ledger(s) 1216, which can be used to record transfers of assets between users 1106 of the service provider and/or one or more third-parties (e.g., merchant network(s), payment card network(s), ACH network(s), equities network(s), the asset network, securities networks, etc.). In doing so, the asset storage 1202 can maintain a running balance of assets managed by the service provider of FIG. 11. The ledger(s) of the asset storage 1202 can further indicate some of the running balance for each of the ledger(s) stored in the asset storage 1202 is assigned or registered to one or more user account(s) 1204.

In at least one example, the asset storage 1202 can include transaction logs 1218, which can include records of past transactions involving the service provider of FIG. 11. In at least one example, transaction data, as described herein, can be stored in association with the transaction logs 1218.

In some examples, the data store(s) 1200 can store a private blockchain 1219. A private blockchain 1219 can function to record sender addresses, recipient addresses, public keys, values of cryptocurrency transferred, and/or can be used to verify ownership of cryptocurrency tokens to be transferred. In some examples, the service provider of FIG. 11 can record transactions taking place within the service provider of FIG. 11 involving cryptocurrency until the number of transactions has exceeded a determined limit (e.g., number of transactions, storage space allocation, etc.). Based at least in part on determining that the limit has been reached, the service provider of FIG. 11 can publish the transactions in the private blockchain 1219 to a public blockchain (e.g., associated with the asset network), where miners can verify the transactions and record the transactions to blocks on the public blockchain. In at least one example, the service provider of FIG. 11 can participate as miner(s) at least for its transactions to be posted to the public blockchain.

In at least one example, the data store(s) 1200 can store and/or manage accounts, such as user account(s) 1204, merchant account(s) 1206, and/or customer account(s) 1208. In at least one example, the user account(s) 1204 may store records of user accounts associated with the users 1106. In at least one example, the user account(s) 1204 can include a user account 1220, which can be associated with a user (of the users 1106). Other user accounts of the user account(s) 1204 can be similarly structured to the user account 1220, according to some examples. In other examples, other user accounts may include more or less data and/or account information than that provided by the user account 1220. In at least one example, the user account 1220 can include user account data 1228, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1228 can include account activity 1230 and user wallet key(s) 1232. The account activity 1230 may include a transaction log for recording transactions associated with the user account 1220. In some examples, the user wallet key(s) 1232 can include a public-private key-pair and a respective address associated with the asset network or other asset networks. In some examples, the user wallet key(s) 1232 may include one or more key pairs, which can be unique to the asset network or other asset networks.

In addition to the user account data 1228, the user account 1220 can include ledger(s) for account(s) managed by the service provider of FIG. 11, for the user. For example, the user account 1220 may include an asset ledger 1234, a fiat currency ledger 1236, and/or one or more other ledgers 1238. The ledger(s) can indicate that a corresponding user utilizes the service provider of FIG. 11 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 11.

In some examples, the asset ledger 1234 can store a balance for each of one or more cryptocurrencies (e.g., Bitcoin, Ethereum, Litecoin, etc.) registered to the user account 1220. In at least one example, the asset ledger 1234 can further record transactions of cryptocurrency assets associated with the user account 1220. For example, the user account 1220 can receive cryptocurrency from the asset network using the user wallet key(s) 1232. In some examples, the user wallet key(s) 1232 may be generated for the user upon request. User wallet key(s) 1232 can be requested by the user in order to send, exchange, or otherwise control the balance of cryptocurrency held by the service provider of FIG. 11 (e.g., in the asset wallet 1210) and registered to the user. In some examples, the user wallet key(s) 1232 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 11 and the value is credited as a balance in asset ledger 1234), by purchasing currency in the form associated with the account using currency in a different form (e.g., buying a value of cryptocurrency from the service provider of FIG. 11 using a value of fiat currency reflected in fiat currency ledger 1214, and crediting the value of cryptocurrency in asset ledger 1234), or by conducting a transaction with another user (customer or merchant) of the service provider of FIG. 11 wherein the account receives incoming currency (which can be in the form associated with the account or a different form, in which the incoming currency may be converted to the form associated with the account). In some examples, the user account data 1228 can include preferences for maintaining balances of individual of the ledgers. For example, the service provider of FIG. 11 can automatically debit the fiat currency ledger 1236 to increase the asset ledger 1234, or another account associated with the user whenever the cryptocurrency balance (e.g., of the asset ledger 1234) falls below a stated level (e.g., a threshold). Conversely, in some embodiments, the service provider of FIG. 11 can automatically credit the fiat currency ledger 1236 to decrease the asset ledger 1234 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 11 (i.e., an external account). In at least one example, the user can transfer all or a portion of a balance of the cryptocurrency stored in the third-party cryptocurrency wallet to the service provider of FIG. 11. Such a transaction can require the user to transfer an amount of the cryptocurrency in a message signed by the user's private key to an address provided by the service provider of FIG. 11. In at least one example, the transaction can be sent to miners to bundle the transaction into a block of transactions and to verify the authenticity of the transactions in the block. Once a miner has verified the block, the block is written to a public, distributed blockchain where the service provider of FIG. 11 can then verify that the transaction has been confirmed and can credit the user's asset ledger 1234 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 11. As described above, in some examples, the service provider of FIG. 11 can acquire cryptocurrency from a third-party source (e.g., associated with the third-party server(s) 118). In such examples, the asset wallet 1210 can be associated with different addresses and can vary addresses used to acquire cryptocurrency so that its holdings are represented under a variety of addresses on a blockchain. When the service provider of FIG. 11 has their own holdings of cryptocurrency, users can acquire cryptocurrency directly from the service provider of FIG. 11. In some examples, the service provider of FIG. 11 can include logic for buying and selling cryptocurrency in order to maintain a desired level of cryptocurrency. The desired level can be based on a volume of transactions over a period, balances of collective user profiles' cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 11 has its own cryptocurrency assets, cryptocurrency transferred in a transaction (e.g., data with address provided for receipt of transaction and a balance of cryptocurrency transferred in the transaction) can be stored in the asset wallet 1210. In at least one example, the service provider of FIG. 11 can credit the asset ledger 1234 of the user. Additionally, while the service provider of FIG. 11 recognizes that the user retains the value of the transferred cryptocurrency through crediting the asset ledger 1234, any person that inspects the blockchain will see the cryptocurrency as having been transferred to the service provider of FIG. 11. In some examples, the asset wallet 1210 can be associated with many different addresses. In such examples, any person that inspects the blockchain may not easily associate all cryptocurrency stored in asset wallet 1210 as belonging to the same entity. It is this presence of a private ledger that is used for real-time transactions and maintained by the service provider of FIG. 11, combined with updates to the public ledger at other times, that allows for extremely fast transactions using cryptocurrency to be achieved. In some examples, the "private ledger" can refer to the asset ledger 1210, which in some examples, can utilize the private blockchain 1219, as described herein. The "public ledger" can correspond to a public blockchain associated with the asset network.

In at least one example, a user's asset ledger 1234, fiat currency ledger 1236, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1234. In some examples, a user can receive fiat currency or another currency in the form of payment for a transaction with another user. In at least one example, at least a portion of such funds can be converted into cryptocurrency by the service provider of FIG. 11 and used to fund the asset ledger 1234 of the user.

As addressed above, in some examples, users can also have other accounts maintained by the service provider of FIG. 11. For example, a user can also have an account in U.S. dollars, which can be tracked, for example, via the fiat currency ledger 1236. Such an account can be funded by transferring money from a bank account at a third-party bank to an account maintained by the service provider of FIG. 11 as is conventionally known. In some examples, a user can receive fiat currency in the form of payment for a transaction with another user. In such examples, at least a portion of such funds can be used to fund the fiat currency ledger 1236.

In some examples, a user can have one or more internal payment cards registered with the service provider of FIG. 11. Internal payment cards can be linked to one or more of the accounts associated with the user account 1220. In some embodiments, options with respect to internal payment cards can be adjusted and managed using an application (e.g., the payment application 1118).

In at least one example, as described above, each ledger can correspond to an account of the user that is managed by the service provider of FIG. 11. In at least one example, individual of the accounts can be associated with a wallet or a stored balance for use in payment transactions, peer-to-peer transactions, payroll payments, etc.

In at least one example, the user account 1220 can be associated with an asset wallet 1240. The asset wallet 1240 of the user can be associated with account information that can be stored in the user account data 1228 and, in some examples, can be associated with the user wallet key(s) 1232. In at least one example, the asset wallet 1240 can store data indicating an address provided for receipt of a cryptocurrency transaction. In at least one example, the balance of the asset wallet 1240 can be based at least in part on a balance of the asset ledger 1234. In at least one example, funds availed via the asset wallet 1240 can be stored in the asset wallet 1240 or the asset wallet 1210. Funds availed via the asset wallet 1210 can be tracked via the asset ledger 1234. The asset wallet 1240, however, can be associated with additional cryptocurrency funds.

In at least one example, when the service provider of FIG. 11 includes a private blockchain 1219 for recording and validating cryptocurrency transactions, the asset wallet 1240 can be used instead of, or in addition to, the asset ledger 1234. For example, at least one example, a merchant can provide the address of the asset wallet 1240 for receiving payments. In an example where a customer is paying in cryptocurrency and the customer has their own cryptocurrency wallet account associated with the service provider of FIG. 11, the customer can send a message signed by its private key including its wallet address (i.e., of the customer) and identifying the cryptocurrency and value to be transferred to the merchant's asset wallet 1240. The service provider of FIG. 11 can complete the transaction by reducing the cryptocurrency balance in the customer's cryptocurrency wallet and increasing the cryptocurrency balance in the merchant's asset wallet 1240. In addition to recording the transaction in the respective cryptocurrency wallets, the transaction can be recorded in the private blockchain 1219 and the transaction can be confirmed. A user can perform a similar transaction with cryptocurrency in a peer-to-peer transaction as described above. In at least one example, the cryptocurrency wallet account 1230 can be funded by a balance transfer from a third-party cryptocurrency wallet, as described above. Such a transaction can require a user to transfer an amount of cryptocurrency in a message signed by the user's private key to an address of the cryptocurrency wallet account 1230. The transferred amount of cryptocurrency can then be within the cryptocurrency wallet account 1230 for use in later transactions.

While the asset ledger 1234 and/or asset wallet 1240 are each described above with reference to cryptocurrency, the asset ledger 1234 and/or asset wallet 1240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

The data stores 1200 may also include a holding account 1242, which may be similar to and perform similar functions as the holding account 146 described with respect to FIG. 1.

It should be noted that user(s) having accounts managed by the service provider of FIG. 11 is an aspect of the technology disclosed that enables technical advantages of increased processing speed and improved security.

Figure 13:
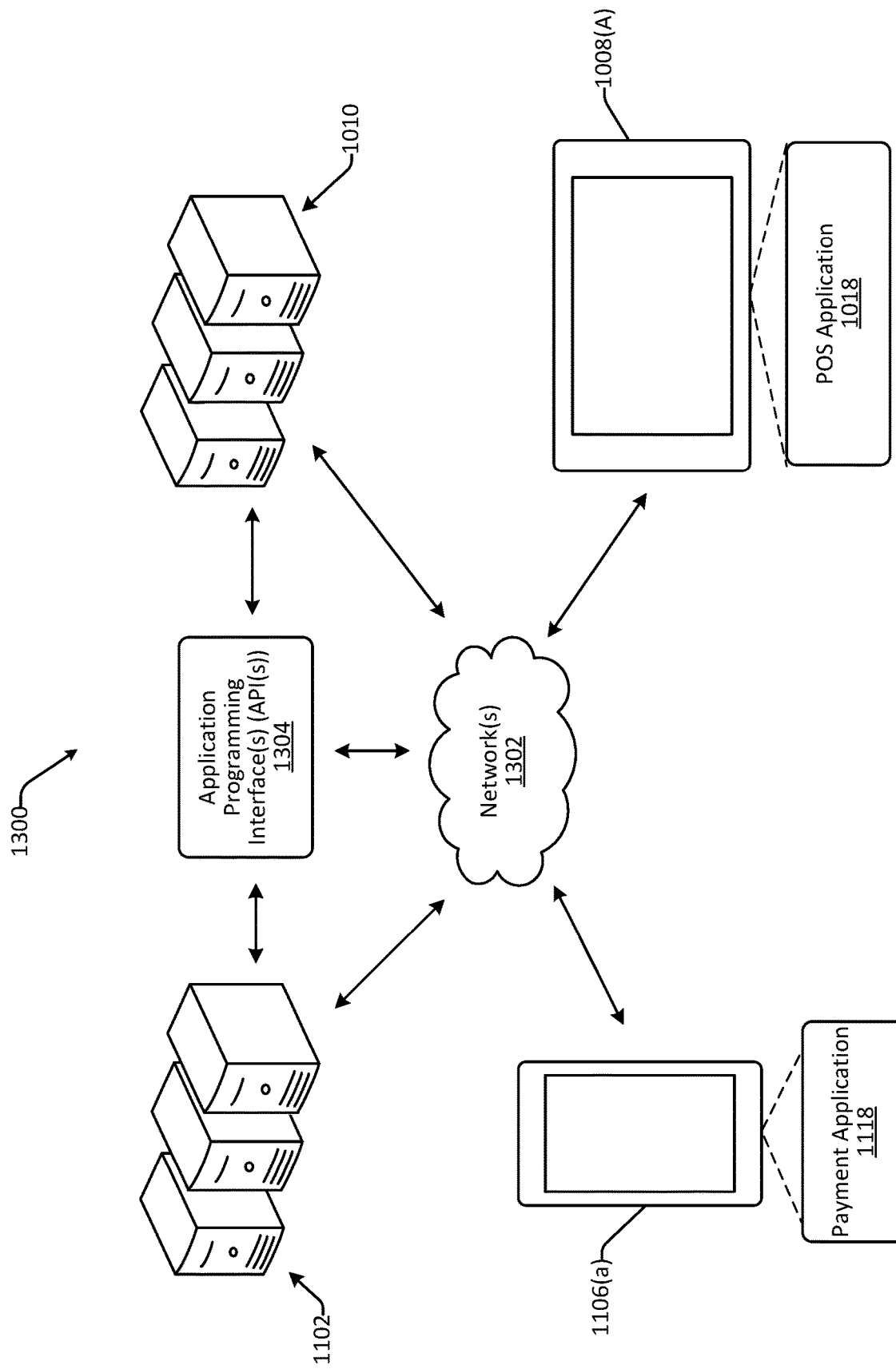
FIG. 13 is an example environment wherein the payment service environment of FIG. 10 and the environment from FIG. 11 can be integrated to enable payments at the point-of-sale using assets associated with user accounts in the peer-to-peer environment of FIG. 11, according to an embodiment described herein.

FIG. 13 is an example environment 1300 wherein the environment 1000 and the environment 1100 can be integrated to enable payments at the point-of-sale using assets associated with user accounts in the peer-to-peer environment of FIG. 11, according to an embodiment described herein. As illustrated, each of the components can communicate with one another via one or more networks 1302. In some examples, one or more APIs 1304 or other functional components can be used to facilitate such communication. For example, the APIs 1304 can be used to facilitate communication with payment service server(s) 1102 and server(s) 1110 associated with third-party service provider(s).

In at least one example, the example environment 1300 can enable contactless payments, via integration of peer-to-peer payment, or other payment making platform(s) and payment processing platform(s), are described herein. For the purpose of FIG. 13, the environment 1000 can refer to a payment processing platform and the environment 1100 can refer to a peer-to-peer payment, or payment making, platform. In an example, such an integration can enable a customer to participate in a transaction via their own computing device instead of interacting with a merchant device of a merchant, such as the merchant device 1008(A). In such an example, the POS application 1018, associated with a payment processing platform and executable by the merchant device 1008(A) of the merchant, can present a Quick Response (QR) code, or other code that can be used to identify a transaction (e.g., a transaction code), in association with a transaction between the customer and the merchant. The QR code, or other transaction code, can be provided to the POS application 1018 via an API associated with the peer-to-peer payment platform. In an example, the customer can utilize their own computing device, such as the user device 1108(A), to capture the QR code, or the other transaction code, and to provide an indication of the captured QR code, or other transaction code, to server(s) 1002 and/or server(s) 1102.

Based at least in part on the integration of the peer-to-peer payment platform and the payment processing platform (e.g., via the API), the server(s) 1002 and/or 1102 associated with each can exchange communications with each other—and with a payment application 1118 associated with the peer-to-peer payment platform and/or the POS application 1018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The customer can use a camera associated with the user device 1108(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1108(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1108(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1118 of a user device 1108(A) of a customer to enable the customer to participate in a transaction via their own computing device. For instance, in a "scan to pay" example as described above, based at least in part on capturing the QR code, or other transaction code, via the user device 1108(A), the payment processing platform can provide transaction data to the peer-to-peer payment platform for presentation via the payment application 1118 on the user device 1108(A). In some examples, the customer can watch items being added to their cart (e.g., via a user interface presented via the payment application). As an item is added to a virtual cart by the merchant-via the POS application 1018 on the merchant device 1008(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1118 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1108(A) during or after payment of the transaction.

In some examples, based at least in part on capturing the QR code, or other transaction code, the payment processing platform can provide transaction data to the peer-to-peer payment platform for presentation via the payment application 1118 on the computing device of the customer, such as the user device 1108(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1118 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 14:
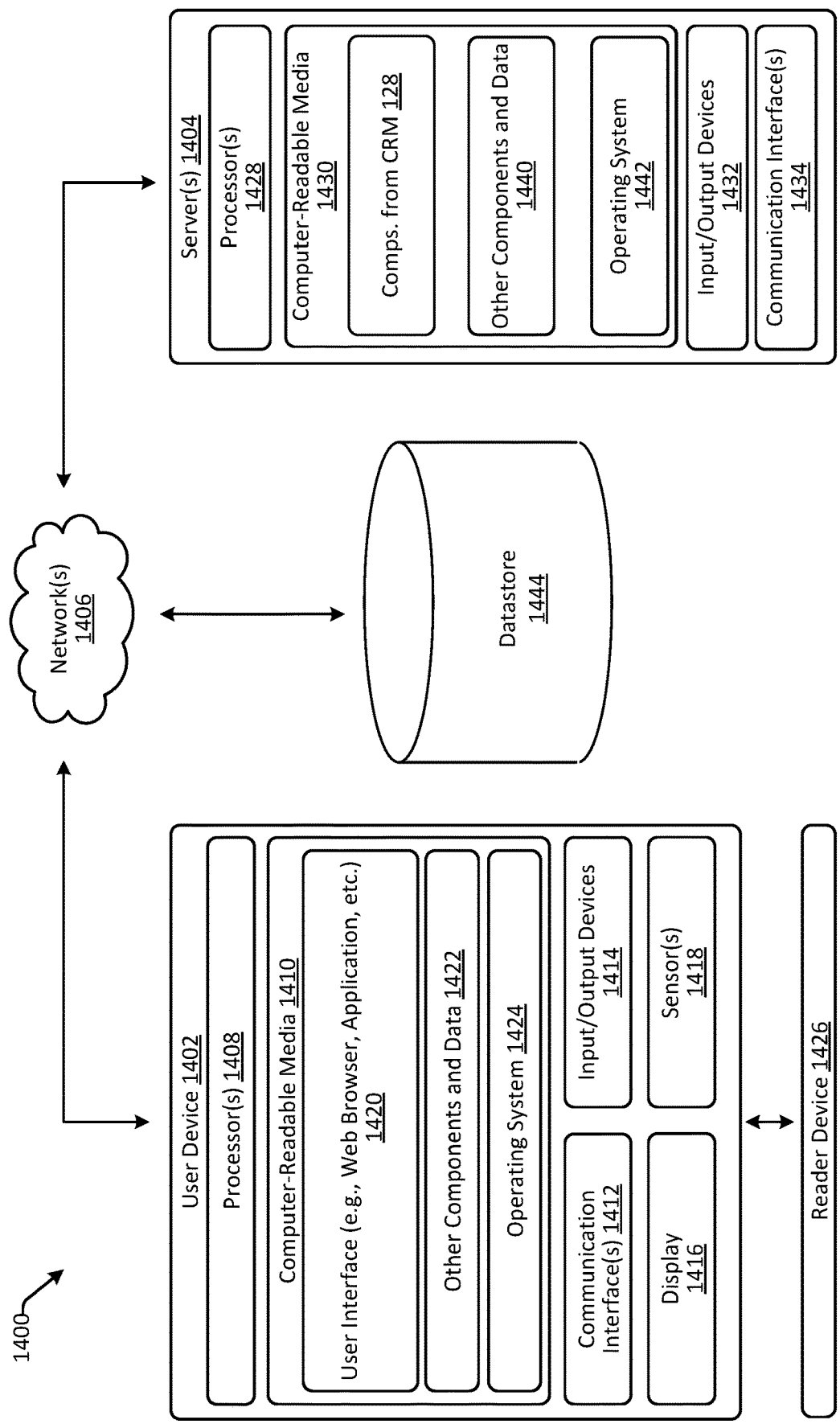
FIG. 14 is an illustrative block diagram illustrating a system for performing techniques described herein, according to an embodiment described herein.

FIG. 14 is an illustrative block diagram illustrating a system for performing techniques described herein, according to an embodiment described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 14.

The user device 1402 may be the same or similar to the user device 102 as described with respect to FIG. 1. Additionally, the server(s) 1404 may be the same or similar to the payment service 104 described with respect to FIG. 1.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IOT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices 1414, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider associated with the server(s) 1404, or which can be an otherwise dedicated application. In some examples, the user interface 1420 can be configured to display options for withdrawing funds to make donations. The user interface 1420 may also be configured to surface information about donations. It should be understood that the user interface 1420 can be configured to display, facilitate, or otherwise perform any of the interactions described herein with respect to transactions or other operations as described herein. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtual reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider 1424, described above, to provide one or more services. That is, in some examples, the service provider 1424 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1414 and/or for sending users 1414 notifications regarding available appointments with merchant(s) located proximate to the users 1414. In at least one example, location can be used for taking payments from nearby customers when they leave a geofence, or location can be used to initiate an action responsive to users 1414 enter a brick-and-mortar store of a merchant. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1426 may also include a biometric sensor to receive and process biometric characteristics and process them as payment instruments, given that such biometric characteristics are registered with the payment service 104 and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more components and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one component for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1412, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1426. When a power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI). PIN Verification Value (PVV). Card Verification Value (CVV). Card Verification Code (CVC), etc.)

associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units, and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage. RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider and/or payment processing service. Functional components stored in the computer-readable media 1430 can optionally include any of the components of the CRM 128 described with respect to FIG. 1.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc., statistical models, etc. In at least one example, machine-trained data models can be stored in a datastore associated with the user device(s) 1402 and/or the server(s) 1404 for use at a time after the data models have been trained (e.g., at runtime).

The one or more other components and data 1440 can include programs, drivers, etc., and the data used or generated by the functional components. Further, the server(s) 1404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component." as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1402 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406.

In at least one example, the datastore 1444 can store user profiles, which can include merchant profiles, customer profiles, and so on. In some examples, the datastore(s) 1444 can store user profiles of customers, merchants, the payment service, etc., as described herein. In some examples, such user profiles can be associated with one or more user accounts.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 612.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1444 can store additional or alternative types of data as described herein.

Example Clauses

1. A method, comprising: determining a first user identifier associated with a user, wherein the first user identifier is used by a first resource: determining a second user identifier associated with the user, wherein the second user identifier is used by a second resource, the first user identifier differing from the second user identifier, the first resource differing from the second resource: generating a centralized identity for the user based at least on the first user identifier and the second user identifier being associated with the user: associating user-related data with the centralized identity, the user-related data including first data associated with the first user identifier and second data associated with the second user identifier: receiving, from a user interface presented via a user device, user input data indicating an intent to access an application: accessing, based on a determination that user input data is associated with the centralized identity, the user-related data utilizing the centralized identity: modifying an instance of the application by applying one or more personalizations to the application based on the user-related data: and causing the instance of the application to be displayed on the user device with the one or more personalizations applied.

2. The method as clause 1 recites, wherein associating the user-related data with the centralized identity includes: generating a first association between the first user identifier and the centralized identity such that the first data is associated with the centralized identity: and generating a second association between the second user identifier and the centralized identity such that the second data is associated with the centralized identity.

3. The method as clause 1 and/or 2 recites, wherein: the first resource is a service of a payment system, wherein a payment application of the payment system is associated with the first user identifier: and the second resource is an ecommerce website of a merchant, wherein the ecommerce website stores the second user identifier in association with purchases made on the ecommerce website.

4. The method as any of clauses 1, 2, and/or 3 recite, wherein the user-related data includes at least one of: transaction data indicating transactions associated with the first resource and the second resource: user preference data indicating user preferences associated with the first resource and the second resource: payment instrument data indicating one or more payment instrument identifiers stored in association with the first resource and the second resource; or user identifier data indicating one or more user identifiers as stored in association with the first resource and the second resource.

5. A system comprising: one or more processors: and non-transitory computer-readable media storing instructions that, when executed by the one or more processors, cause the system to perform operations comprising: determining a first user identifier associated with a user, wherein the first user identifier is used by a first resource: determining a second user identifier associated with the user, wherein the second user identifier is used by a second resource: generating a centralized identity based at least in part on the first user identifier and the second user identifier being associated with the user: associating the centralized identity with user-related data including first data associated with the first user identifier from the first resource and second data associated with the second user identifier from the second resource; receiving user input data associated with use of an application, wherein the user input data is associated with the centralized identity: modifying, based at least in part on the centralized identity associated with the user input data, an instance of the application by applying one or more personalizations to the application using the user-related data: and causing the instance of the application to be displayed with the one or more personalizations applied.

6. The system as clause 5 recites, wherein associating the user-related data with the centralized identity includes: generating a first association between the first user identifier and the centralized identity such that the first data is associated with the centralized identity: and generating a second association between the second user identifier and the centralized identity such that the second data is associated with the centralized identity.

7. The system as clause 5 and/or 6 recites, wherein associating the user-related data with the centralized identity includes: querying the first resource for the first data: querying the second resource for the second data: and storing an instance of the first data and the second data as the user-related data in association with the centralized identity.

8. The system as any of clauses 5, 6, and/or 7 recite, the operations further comprising: determining, from the user input data, a user profile being utilized to access functionality of the application: determining that the user profile is mapped to the centralized identity: and selecting the centralized identity based at least in part on the user profile being mapped to the centralized identity.

9. The system as any of clauses 5, 6, 7, and/or 8 recite, the operations further comprising: determining, from the user-related data, that the user has purchased previous items having an item characteristic in association with the first resource and the second resource; and based at least in part on determining that the user has purchased the previous items having the item characteristic in association with the first resource and the second resource, applying the one or more personalizations to include configuring items offered by the merchant to emphasize a portion of the items that are associated with the item characteristic.

10. The system as any of clauses 5, 6, 7, 8, and/or 9 recite, the operation further comprising: determining, from the user-related data, that the user is associated with an incentive from at least one of the first resource or the second resource: and based at least in part on determining that the user is associated with the incentive, applying the one or more personalizations to include causing display of an indicator of the incentive with the instance of the application.

11. The system as any of clauses 5, 6, 7, 8, 9, and/or 10 recite, the operations further comprising: determining, from the user-related data, that the first resource indicates a first appointment associated with the user and the second resource indicates a second appointment associated with the user: and based at least in part on determining that the first resource indicates the first appoint and the second resources indicates the second appointment, applying the one or more personalizations to include presenting the first appointment and the second appointment concurrently with the instance of the application.

12. The system as any of clauses 5, 6, 7, 8, 9, 10, and/or 11 recite, the operations further comprising: determining, from the user-related data, user preferences of the user as provided by the first resource and the second resource: and based at least in part on determining the user preferences, applying the one or more personalizations to include presenting item details associated with items offered by the merchants, the item details determined from the user preferences.

13. A computer-implemented method comprising: determining a first identifier associated with a user as stored with a first resource: determining a second identifier associated with the user as stored with a second resource: generating a centralized identity associated with user-related data that includes first data associated with the first identifier from the first resource and second data associated with the second identifier from the second resource; receiving user input data in association with an application, the user input data associated with the centralized identity: modifying, based at least in part on the user input data being associated with the centralized identity, an instance of the application by applying one or more personalizations to the application using the user-related data.

14. The computer-implemented method as clause 13 recites, further comprising: determining, from the user-related data, user identifying information associated with the first resource and the second resource: and based at least in part on determining the user identifying information, applying the one or more personalizations to include auto-populating the instance of the application with the user identifying information.

15. The computer-implemented method as clause 13 and/or 14 recites, further comprising: determining, from the user-related data, merchants that the user has interacted with prior to receiving the user input data: and generating one or more interactive elements, wherein individual ones of the interactive elements corresponds to a given merchant of the merchants and is configured to cause the instance of the application to be presented in a foreground of a user device from which the user input data is received.

16. The computer-implemented method as any of clauses 13, 14, and/or 15 recite, further comprising: determining, from the user-related data, that the user has utilized a previous single use payment instrument in association with the first resource and the second resource; and based at least in part on determining that the user has utilized the previous single use payment instrument in association with the first resource and the second resource, applying the one or more personalizations to include display of a single use payment option for purchasing an item from the merchant.

17. The computer-implemented method as any of clauses 13, 14, 15, and/or 16 recite, further comprising: determining a similarity metric between identifying information from the first data and identifying information from the second data: determining that the similarity metric satisfies a threshold similarity score that indicates the first identifier and the second identifier are associated with a same user: and wherein generating the centralized identity is based at least in part on the similarity metric satisfying the threshold similarity score.

18. The computer-implemented method as any of clauses 13, 14, 15, 16, and/or 17 recite, wherein the user-related data includes at least one of: transaction data indicating transactions associated with the first resource and the second resource: user preference data indicating user preferences associated with the first resource and the second resource: payment instrument data indicating one or more payment instrument identifiers stored in association with the first resource and the second resource: or user identifier data indicating one or more user identifiers as stored in association with the first resource and the second resource.

19. The computer-implemented method as any of clauses 13, 14, 15, 16, 17, and/or 18 recite, further comprising: determining, from the user-related data, prior transactions of the user made in association with the first resource and the second resource: and based at least in part on determining the prior transactions, applying the one or more personalizations to include presenting item details associated with items offered by the merchants, the item details determined from the prior transactions.

20. The computer-implemented method as any of clauses 13, 14, 15, 16, 17, 18, and/or 19 recite, further comprising: determining a first set of personalizations based at least in part on the first data from the first resource: determining a second set of personalizations based at least in part on the second data from the second resource: and selecting the one or more personalizations from the first set of personalizations instead of the second set of personalizations based at least in part on a first confidence value associated with the first set of personalizations and a second confidence value associated with the second set of personalizations.

The phrases "in some examples." "according to various examples." "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could." or "might" be included or have a characteristic, that particular component or feature is not required to be included or have the characteristic.

Further, the aforementioned description is directed to devices and applications that are related to payment technology. However, it will be understood that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 3, 5, 8, and 9) for convenience and ease of understanding. However, the methods illustrated are not limited to being performed using components described in FIGS. 1-2H, 4, 6, 7, and 10-14, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method, comprising:
    determining a first user identifier associated with a user, wherein the first user identifier is used by a first resource;
    determining a second user identifier associated with the user, wherein the second user identifier is used by a second resource, the first user identifier differing from the second user identifier, the first resource differing from the second resource;
    generating a centralized identity for the user based at least on the first user identifier and the second user identifier being associated with the user;
    associating, in response to generating the centralized identity, user-related data with the centralized identity, the user-related data including first data associated with the first user identifier and second data associated with the second user identifier, wherein associating further comprises:
        identifying a first portion of the first data stored by the first resource as being associated with the centralized identity; and
        identifying a second portion of the second data stored by the second resource as being associated with the centralized identity;
    receiving, from a user interface presented via a user device, user input data indicating an intent to access an application;
    accessing, based on a determination that the user input data is associated with the centralized identity, the user-related data utilizing the centralized identity;
    modifying, based on accessing the user-related data, an instance of the application by applying one or more personalizations to the application based on at least the first portion of the first data associated with the first resource and at least the second portion of the second data associated with the second resource, wherein modifying the instance of the application includes sending a command to the user device, the command configured to cause auto-population of the one or more personalizations on an updated user interface; and
    causing the instance of the application to auto-populate the one or more personalizations on a display of the user device.

2. The method as claim 1 recites, wherein associating the user-related data with the centralized identity further includes:
    generating a first association between the first user identifier and the centralized identity such that the first portion of the first data is associated with the centralized identity; and
    generating a second association between the second user identifier and the centralized identity such that the second portion of the second data is associated with the centralized identity.

3. The method as claim 1 recites, wherein:
    the first resource is a service of a payment system, wherein a payment application of the payment system is associated with the first user identifier; and
    the second resource is an ecommerce website of a merchant, wherein the ecommerce website stores the second user identifier in association with purchases made on the ecommerce website.

4. The method as claim 1 recites, wherein the user-related data includes at least one of:
    transaction data indicating transactions associated with the first resource and the second resource;
    user preference data indicating user preferences associated with the first resource and the second resource;
    payment instrument data indicating one or more payment instrument identifiers stored in association with the first resource and the second resource; or
    user identifier data indicating one or more user identifiers as stored in association with the first resource and the second resource.

5. A system comprising:
    one or more processors; and
    non-transitory computer-readable media storing instructions that, when executed by the one or more processors, cause the system to perform operations comprising:
        determining a first user identifier associated with a user, wherein the first user identifier is used by a first resource;
        determining a second user identifier associated with the user, wherein the second user identifier is used by a second resource;
        generating a centralized identity based at least in part on the first user identifier and the second user identifier being associated with the user;
        associating the centralized identity with user-related data including first data associated with the first user identifier from the first resource and second data associated with the second user identifier from the second resource, wherein associating further comprises:
            identifying a first portion of the first data stored by the first resource as being associated with the centralized identity; and
            identifying a second portion of the second data stored by the second resource as being associated with the centralized identity;
        receiving user input data associated with use of an application, wherein the user input data is associated with the centralized identity;
        modifying, based on receiving the user input data, an instance of the application by applying one or more personalizations to the application based on at least the first portion of the first data associated with the first resource and at least the second portion of the second data associated with the second resource, wherein modifying the instance of the application includes sending a command to a user device of the user, the command configured to cause auto-population of the one or more personalizations on an updated user interface; and
        causing the instance of the application to auto-populate the one or more personalizations on a display.

6. The system as claim 5 recites, wherein associating the user-related data with the centralized identity further includes:
   generating a first association between the first user identifier and the centralized identity such that the first portion of the first data is associated with the centralized identity; and
   generating a second association between the second user identifier and the centralized identity such that the second portion of the second data is associated with the centralized identity.

7. The system as claim 5 recites, wherein associating the user-related data with the centralized identity further includes:
   querying the first resource for the first portion of the first data;
   querying the second resource for the second portion of the second data; and
   storing an instance of the first portion of the first data and the second portion of the second data as the user-related data in association with the centralized identity.

8. The system as claim 5 recites, the operations further comprising:
   determining, from the user input data, a user profile being utilized to access functionality of the application;
   determining that the user profile is mapped to the centralized identity; and
   selecting the centralized identity based at least in part on the user profile being mapped to the centralized identity.

9. The system as claim 5 recites, the operations further comprising:
   determining, from the user-related data, that the user has purchased previous items having an item characteristic in association with the first resource and the second resource; and
   based at least in part on determining that the user has purchased the previous items having the item characteristic in association with the first resource and the second resource, applying the one or more personalizations to include configuring items offered by a merchant to emphasize a portion of the items that are associated with the item characteristic.

10. The system as claim 5 recites, the operations further comprising:
    determining, from the user-related data, that the user is associated with an incentive from at least one of the first resource or the second resource; and
    based at least in part on determining that the user is associated with the incentive, applying the one or more personalizations to include causing display of an indicator of the incentive with the instance of the application.

11. The system as claim 5 recites, the operations further comprising:
    determining, from the user-related data, that the first resource indicates a first appointment associated with the user and the second resource indicates a second appointment associated with the user; and
    based at least in part on determining that the first resource indicates the first appointment and the second resource indicates the second appointment, applying the one or more personalizations to include presenting the first appointment and the second appointment concurrently with the instance of the application.

12. The system as claim 5 recites, the operations further comprising:
    determining, from the user-related data, user preferences of the user as provided by the first resource and the second resource; and
    based at least in part on determining the user preferences, applying the one or more personalizations to include presenting item details associated with items offered by a merchant, the item details determined from the user preferences.

13. A computer-implemented method comprising:
    determining a first identifier associated with a user as stored with a first resource;
    determining a second identifier associated with the user as stored with a second resource;
    generating a centralized identity associated with user-related data that includes a first portion of first data associated with the first identifier from the first resource and a second portion of second data associated with the second identifier from the second resource;
    receiving user input data in association with an application, the user input data associated with the centralized identity; and
    modifying, based on receiving the user input data, an instance of the application by applying one or more personalizations to the application based on at least the first portion of the first data associated with the first resource and at least the second portion of the second data associated with the second resource, wherein modifying the instance of the application includes sending a command to a user device of the user, the command configured to cause auto-population of the one or more personalizations on an updated user interface.

14. The computer-implemented method as claim 13 recites, further comprising:
    determining, from the user-related data, user identifying information associated with the first resource and the second resource; and
    based at least in part on determining the user identifying information, applying the one or more personalizations to include auto-populating the instance of the application with the user identifying information.

15. The computer-implemented method as claim 13 recites, further comprising:
    determining, from the user-related data, merchants that the user has interacted with prior to receiving the user input data; and
    generating one or more interactive elements, wherein individual ones of the one or more interactive elements corresponds to a given merchant of the merchants and is configured to cause the instance of the application to be presented in a foreground of a user device from which the user input data is received.

16. The computer-implemented method as claim 13 recites, further comprising:
    determining, from the user-related data, that the user has utilized a previous single use payment instrument in association with the first resource and the second resource; and
    based at least in part on determining that the user has utilized the previous single use payment instrument in association with the first resource and the second resource, applying the one or more personalizations to include auto-population of a single use payment option for purchasing an item from a merchant.

17. The computer-implemented method as claim 13 recites, further comprising:
   determining a similarity metric between identifying information from the first data and identifying information from the second data;
   determining that the similarity metric satisfies a threshold similarity score that indicates the first identifier and the second identifier are associated with a same user; and
   wherein generating the centralized identity is based at least in part on the similarity metric satisfying the threshold similarity score.

18. The computer-implemented method as claim 13 recites, wherein the user-related data includes at least one of:
   transaction data indicating transactions associated with the first resource and the second resource;
   user preference data indicating user preferences associated with the first resource and the second resource;
   payment instrument data indicating one or more payment instrument identifiers stored in association with the first resource and the second resource; or
   user identifier data indicating one or more user identifiers as stored in association with the first resource and the second resource.

19. The computer-implemented method as claim 13 recites, further comprising:
   determining a first set of personalizations based at least in part on the first data from the first resource;
   determining a second set of personalizations based at least in part on the second data from the second resource; and
   selecting the one or more personalizations from the first set of personalizations instead of the second set of personalizations based at least in part on a first confidence value associated with the first set of personalizations and a second confidence value associated with the second set of personalizations.

20. The system as claim 5 recites, wherein prior to modifying the instance of the application, the operations further comprising:
   receiving, based on the user input data associated with the use of the application and using the centralized identity, third data from the first resource and fourth data from the second resource; and
   wherein modifying the instance of the application is based at least in part on a portion of the third data associated with the first resource or a portion of the fourth data associated with the second resource.

* * * * *